US009778372B2

United States Patent
Moeglein et al.

(10) Patent No.: US 9,778,372 B2
(45) Date of Patent: Oct. 3, 2017

(54) WIRELESS NETWORK HYBRID POSITIONING

(71) Applicant: QUALCOMM Incorporated, San Diego, CA (US)

(72) Inventors: Mark Leo Moeglein, Ashland, OR (US); Douglas Neal Rowitch, Honolulu, HI (US); Wyatt Thomas Riley, Chesterbrook, PA (US); James Douglass DeLoach, Jr., Los Altos, CA (US); Leonid Sheynblat, Hillsborough, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 14/505,095

(22) Filed: Oct. 2, 2014

(65) Prior Publication Data

US 2015/0057018 A1 Feb. 26, 2015

Related U.S. Application Data

(60) Division of application No. 13/354,235, filed on Jan. 19, 2012, now Pat. No. 9,335,419, which is a
(Continued)

(51) Int. Cl.
*H04W 64/00* (2009.01)
*G01S 19/48* (2010.01)
(Continued)

(52) U.S. Cl.
CPC ............ *G01S 19/48* (2013.01); *G01S 5/0036* (2013.01); *G01S 5/0242* (2013.01);
(Continued)

(58) Field of Classification Search
CPC .................................................. H04W 64/00
(Continued)

(56) References Cited

U.S. PATENT DOCUMENTS 5,276,905 A 1/1994 Hurst et al.
5,276,906 A 1/1994 Felix
(Continued)

FOREIGN PATENT DOCUMENTS

CA 2296812 A1 8/2000
CN 1334688 A 2/2002
(Continued)

OTHER PUBLICATIONS

3GPP TS 25.305 V7.3.0, (Jun. 2006), 3rd Generation Partnership Project; Technical Specification Group Radio Access Network, "Stage 2 functional specification of User Equipment (UE) positioning in UTRAN (Release 7)," pp. 1-79.
(Continued)

*Primary Examiner* — Muthuswamy Manoharan
(74) *Attorney, Agent, or Firm* — Thien T. Nguyen

(57) ABSTRACT

Methods and apparatuses for position determination and other operations. In one embodiment of the present invention, a mobile station uses wireless signals from a plurality of wireless networks (e.g., with different air interfaces and/or operated by different service providers) for position determination (e.g., for data communication, for obtaining time and/or frequency information, for range measurement, for sector or altitude estimation). In one embodiment of the present invention, mobile stations are used to harvest statistical data about wireless access points (e.g., the locations of mobile stations that have received signals from the wireless access points, such as from cellular base stations, wireless local area network access points, repeaters for positioning signals or other wireless communication trans-
(Continued)

mitters) and to derive location information (e.g., position and coverage area of the wireless access points) for the wireless networks from the collected statistical data.

38 Claims, 14 Drawing Sheets

Related U.S. Application Data continuation of application No. 10/877,205, filed on Jun. 25, 2004, now Pat. No. 8,971,913.

(60) Provisional application No. 60/483,094, filed on Jun. 27, 2003.

(51) Int. Cl.
  *G01S 5/00* (2006.01)
  *G01S 5/02* (2010.01)
  *G01S 5/10* (2006.01)
  *G01S 19/13* (2010.01)
  G01S 19/11 (2010.01)

(52) U.S. Cl.
  CPC .............. *G01S 5/0257* (2013.01); *G01S 5/10* (2013.01); *G01S 19/13* (2013.01); *H04W 64/00* (2013.01); *H04W 64/003* (2013.01); G01S 5/0236 (2013.01); G01S 19/11 (2013.01)

(58) Field of Classification Search
  USPC ...................................................... 455/456.1
  See application file for complete search history.

(56) References Cited

U.S. PATENT DOCUMENTS

| | | | |
|---|---|---|---|
| 5,327,144 A | 7/1994 | Stilp et al. | |
| 5,512,908 A | 4/1996 | Herrick | |
| 5,708,975 A | 1/1998 | Heiskari et al. | |
| 5,717,406 A | 2/1998 | Sanderford et al. | |
| 5,805,581 A | 9/1998 | Uchida et al. | |
| 5,812,087 A | 9/1998 | Krasner | |
| 5,841,396 A | 11/1998 | Krasner | |
| 5,874,914 A | 2/1999 | Krasner | |
| 5,945,944 A | 8/1999 | Krasner | |
| 5,999,124 A | 12/1999 | Sheynblat | |
| 6,055,434 A | 4/2000 | Seraj | |
| 6,061,018 A | 5/2000 | Sheynblat | |
| 6,091,362 A | 7/2000 | Stilp et al. | |
| 6,104,338 A | 8/2000 | Krasner | |
| 6,108,558 A | 8/2000 | Vanderspool, II | |
| 6,111,538 A | 8/2000 | Schuchman et al. | |
| 6,128,492 A | 10/2000 | Chung | |
| 6,147,644 A | 11/2000 | Castles et al. | |
| 6,185,427 B1 | 2/2001 | Krasner et al. | |
| 6,208,290 B1 | 3/2001 | Krasner | |
| 6,215,442 B1 | 4/2001 | Sheynblat et al. | |
| 6,230,018 B1 | 5/2001 | Watters et al. | |
| 6,236,365 B1 | 5/2001 | LeBlanc et al. | |
| 6,236,635 B1 | 5/2001 | Miyamoto et al. | |
| 6,249,252 B1 | 6/2001 | Dupray | |
| 6,271,788 B1 | 8/2001 | Longaker et al. | |
| 6,275,707 B1 | 8/2001 | Reed et al. | |
| 6,327,533 B1 * | 12/2001 | Chou .................... | G01S 5/0027 340/988 |
| 6,353,412 B1 | 3/2002 | Soliman | |
| 6,389,291 B1 | 5/2002 | Pande et al. | |
| 6,414,635 B1 | 7/2002 | Stewart et al. | |
| 6,420,999 B1 | 7/2002 | Vayanos | |
| 6,430,415 B1 | 8/2002 | Agashe et al. | |
| 6,445,927 B1 | 9/2002 | King et al. | |
| 6,466,938 B1 | 10/2002 | Goldberg | |
| 6,593,863 B2 | 7/2003 | Pitio | |
| 6,597,916 B2 | 7/2003 | Edge | |
| 6,650,288 B1 | 11/2003 | Pitt et al. | |
| 6,677,894 B2 | 1/2004 | Sheynblat et al. | |
| 6,677,895 B1 | 1/2004 | Holt | |
| 6,704,574 B2 | 3/2004 | Lin | |
| 6,754,488 B1 | 6/2004 | Won et al. | |
| 6,757,545 B2 | 6/2004 | Nowak et al. | |
| 6,799,047 B1 | 9/2004 | Bahl et al. | |
| 6,801,778 B2 | 10/2004 | Koorapaty et al. | |
| 6,865,395 B2 | 3/2005 | Riley | |
| 6,888,811 B2 | 5/2005 | Eaton et al. | |
| 6,937,867 B2 | 8/2005 | Oda et al. | |
| 6,941,145 B2 | 9/2005 | Ogino et al. | |
| 6,956,527 B2 | 10/2005 | Rogers et al. | |
| 6,973,320 B2 | 12/2005 | Brown et al. | |
| 6,990,428 B1 | 1/2006 | Kaiser et al. | |
| 7,006,834 B2 | 2/2006 | Gaal et al. | |
| 7,006,838 B2 | 2/2006 | Diener et al. | |
| 7,039,418 B2 | 5/2006 | Amerga et al. | |
| 7,047,022 B2 | 5/2006 | Aoyama | |
| 7,054,627 B1 | 5/2006 | Hillman | |
| 7,057,557 B2 | 6/2006 | Lee | |
| 7,068,999 B2 | 6/2006 | Ballai | |
| 7,069,024 B2 | 6/2006 | Sharony | |
| 7,082,311 B2 | 7/2006 | Hefner et al. | |
| 7,110,774 B1 * | 9/2006 | Davis .................... | H04W 64/00 342/450 |
| 7,113,792 B2 | 9/2006 | Glazko et al. | |
| 7,127,257 B2 | 10/2006 | Riley et al. | |
| 7,139,580 B2 | 11/2006 | Stein et al. | |
| 7,142,848 B2 | 11/2006 | Owen et al. | |
| 7,149,531 B2 | 12/2006 | Misikangas | |
| 7,158,798 B2 | 1/2007 | Lee et al. | |
| 7,203,503 B2 | 4/2007 | Cedervall et al. | |
| 7,206,585 B2 | 4/2007 | Gilham et al. | |
| 7,215,281 B2 | 5/2007 | Tekinay et al. | |
| 7,224,982 B2 | 5/2007 | Ormson | |
| 7,224,983 B2 | 5/2007 | Budka et al. | |
| 7,248,858 B2 | 7/2007 | Barber et al. | |
| 7,251,493 B2 | 7/2007 | Camp, Jr. et al. | |
| 7,257,411 B2 | 8/2007 | Gwon et al. | |
| 7,257,413 B2 | 8/2007 | Sheynblat | |
| 7,277,054 B2 | 10/2007 | Alanen et al. | |
| 7,280,505 B2 | 10/2007 | Chaskar et al. | |
| 7,295,808 B2 | 11/2007 | Soliman | |
| 7,319,878 B2 | 1/2008 | Sheynblat et al. | |
| 7,355,995 B2 * | 4/2008 | Ogino ................ | H04B 7/18547 370/328 |
| 7,369,859 B2 | 5/2008 | Gallagher | |
| 7,522,588 B2 | 4/2009 | Biacs et al. | |
| 7,590,424 B2 | 9/2009 | Yamamoto et al. | |
| 7,706,813 B2 | 4/2010 | Shim | |
| 7,778,639 B2 | 8/2010 | Shim | |
| 7,831,263 B2 | 11/2010 | Sheynblat et al. | |
| 7,873,375 B2 | 1/2011 | Annunziato et al. | |
| 8,068,056 B2 | 11/2011 | Wachter et al. | |
| 8,320,934 B2 | 11/2012 | Sheynblat | |
| 8,483,717 B2 | 7/2013 | Sheynblat | |
| 2002/0080759 A1 | 6/2002 | Harrington et al. | |
| 2002/0094821 A1 | 7/2002 | Kennedy, Jr. | |
| 2002/0116368 A1 | 8/2002 | Matsumoto | |
| 2002/0137526 A1 | 9/2002 | Shinohara | |
| 2002/0168989 A1 | 11/2002 | Dooley et al. | |
| 2002/0199196 A1 | 12/2002 | Rabinowitz et al. | |
| 2003/0006931 A1 | 1/2003 | Mages | |
| 2003/0008663 A1 | 1/2003 | Stein et al. | |
| 2003/0008664 A1 | 1/2003 | Stein et al. | |
| 2003/0022675 A1 | 1/2003 | Mergler | |
| 2003/0040323 A1 * | 2/2003 | Pihl ..................... | H04W 64/00 455/456.1 |
| 2003/0069033 A1 | 4/2003 | Edge et al. | |
| 2003/0096622 A1 | 5/2003 | Moilanen | |
| 2003/0096624 A1 * | 5/2003 | Ormson .................... | G01S 5/10 455/456.1 |
| 2003/0125044 A1 | 7/2003 | Deloach et al. | |
| 2003/0125045 A1 | 7/2003 | Riley et al. | |
| 2003/0144006 A1 | 7/2003 | Johansson et al. | |
| 2003/0157943 A1 | 8/2003 | Sabat, Jr. | |
| 2003/0176196 A1 | 9/2003 | Hall et al. | |
| 2003/0210142 A1 | 11/2003 | Freathy et al. | |

(56) References Cited

U.S. PATENT DOCUMENTS

| | | | |
|---|---|---|---|
| 2003/0220105 A1 | 11/2003 | Daigremont et al. | |
| 2003/0222819 A1* | 12/2003 | Karr | G01C 21/206 342/457 |
| 2003/0235172 A1 | 12/2003 | Wood | |
| 2004/0002346 A1 | 1/2004 | Santhoff | |
| 2004/0043765 A1 | 3/2004 | Tolhurst | |
| 2004/0053625 A1* | 3/2004 | Bye | H04M 1/72572 455/456.1 |
| 2004/0077361 A1 | 4/2004 | Ishidoshiro | |
| 2004/0127229 A1 | 7/2004 | Ishii | |
| 2004/0162090 A1 | 8/2004 | Suryanarayana et al. | |
| 2004/0203567 A1 | 10/2004 | Berger | |
| 2004/0203926 A1 | 10/2004 | Ruutu et al. | |
| 2004/0258012 A1 | 12/2004 | Ishii | |
| 2004/0259546 A1 | 12/2004 | Balachandran et al. | |
| 2005/0004527 A1 | 1/2005 | Prescott | |
| 2005/0014497 A1 | 1/2005 | Goren | |
| 2005/0020309 A1 | 1/2005 | Moeglein et al. | |
| 2005/0037775 A1 | 2/2005 | Moeglein et al. | |
| 2005/0043038 A1 | 2/2005 | Maanoja et al. | |
| 2005/0062643 A1 | 3/2005 | Pande et al. | |
| 2005/0064877 A1 | 3/2005 | Gum et al. | |
| 2005/0124355 A1 | 6/2005 | Cromer et al. | |
| 2005/0125493 A1 | 6/2005 | Chaskar et al. | |
| 2005/0153687 A1 | 7/2005 | Niemenmaa et al. | |
| 2005/0197137 A1 | 9/2005 | Radic et al. | |
| 2005/0227689 A1 | 10/2005 | Jewett | |
| 2005/0227705 A1 | 10/2005 | Rousu et al. | |
| 2005/0227707 A1 | 10/2005 | Law et al. | |
| 2005/0232189 A1 | 10/2005 | Loushine | |
| 2005/0246334 A1 | 11/2005 | Tao et al. | |
| 2005/0250516 A1 | 11/2005 | Shim | |
| 2006/0245406 A1 | 11/2006 | Shim | |
| 2007/0001867 A1 | 1/2007 | Rowe et al. | |
| 2007/0002813 A1 | 1/2007 | Tenny et al. | |
| 2007/0037586 A1 | 2/2007 | Kim et al. | |
| 2007/0121560 A1 | 5/2007 | Edge | |
| 2007/0140163 A1 | 6/2007 | Meier et al. | |
| 2008/0123608 A1 | 5/2008 | Edge et al. | |
| 2008/0280624 A1 | 11/2008 | Wrappe | |
| 2009/0104904 A1 | 4/2009 | Shim | |
| 2009/0143076 A1 | 6/2009 | Wachter et al. | |
| 2012/0115508 A1 | 5/2012 | Moeglein et al. | |
| 2013/0095850 A1 | 4/2013 | Sheynblat | |
| 2015/0018009 A1 | 1/2015 | Moeglein et al. | |

FOREIGN PATENT DOCUMENTS

| | | |
|---|---|---|
| CN | 1373371 A | 10/2002 |
| CN | 1375999 A | 10/2002 |
| CN | 1413058 | 4/2003 |
| DE | 10142954 A1 | 4/2003 |
| EP | 0933961 A2 | 8/1999 |
| EP | 1215928 A2 | 6/2002 |
| EP | 1289320 A1 | 3/2003 |
| EP | 1387590 A2 | 2/2004 |
| JP | 6148308 A | 5/1994 |
| JP | 10213644 | 8/1998 |
| JP | 2000156881 | 6/2000 |
| JP | 2001500256 | 1/2001 |
| JP | 2001305210 A | 10/2001 |
| JP | 2001333184 | 11/2001 |
| JP | 2002077965 | 3/2002 |
| JP | 2002510893 | 4/2002 |
| JP | 2002195846 A | 7/2002 |
| JP | 2002236163 A | 8/2002 |
| JP | 2002246976 A | 8/2002 |
| JP | 2003014488 A | 1/2003 |
| JP | 2003023384 A | 1/2003 |
| JP | 2003047045 A | 2/2003 |
| JP | 2003152633 | 5/2003 |
| JP | 2003520532 A | 7/2003 |
| JP | 2003319443 | 11/2003 |
| JP | 2004040775 | 2/2004 |
| JP | 2004086349 A | 3/2004 |
| JP | 2004129026 A | 4/2004 |
| JP | 2005195429 | 7/2005 |
| JP | 2005525003 A | 8/2005 |
| JP | 2005525016 | 8/2005 |
| JP | 2005536944 A | 12/2005 |
| JP | 2007518979 A | 7/2007 |
| JP | 2007520915 A | 7/2007 |
| KR | 19980702271 | 7/1998 |
| KR | 19990047966 | 7/1999 |
| KR | 20000022270 A | 4/2000 |
| KR | 20010087969 A | 9/2001 |
| KR | 20020073167 | 9/2002 |
| KR | 20030011866 | 2/2003 |
| KR | 20030052838 A | 6/2003 |
| KR | 20030079972 | 10/2003 |
| KR | 20050098901 | 10/2005 |
| RU | 2001531 C1 | 10/1993 |
| RU | 2163053 C2 | 2/2001 |
| WO | WO-9307684 A1 | 4/1993 |
| WO | WO-9810306 A1 | 3/1998 |
| WO | WO-0027143 A1 | 5/2000 |
| WO | WO-0133302 A2 | 5/2001 |
| WO | WO-0154422 A2 | 7/2001 |
| WO | WO-0221873 A1 | 3/2002 |
| WO | WO-0223215 A1 | 3/2002 |
| WO | WO-0246788 A2 | 6/2002 |
| WO | WO-02071781 A1 | 9/2002 |
| WO | WO-02079797 A1 | 10/2002 |
| WO | WO-02082850 A1 | 10/2002 |
| WO | WO-03010552 A2 | 2/2003 |
| WO | WO-03021286 A2 | 3/2003 |
| WO | WO-03021851 A2 | 3/2003 |
| WO | WO-03065740 A2 | 8/2003 |
| WO | WO-03094285 A2 | 11/2003 |
| WO | WO-03094564 A1 | 11/2003 |
| WO | WO-2004017092 A1 | 2/2004 |
| WO | WO-2004019559 | 3/2004 |
| WO | WO-2004106964 A2 | 12/2004 |
| WO | WO-2005004527 A1 | 1/2005 |
| WO | WO-2005004528 A1 | 1/2005 |
| WO | WO-2005027393 | 3/2005 |
| WO | WO-2005046254 A2 | 5/2005 |
| WO | WO-2005065320 A2 | 7/2005 |
| WO | WO-2005089384 A2 | 9/2005 |
| WO | WO-2007027166 | 3/2007 |
| WO | WO-2007056738 A2 | 5/2007 |

OTHER PUBLICATIONS

3GPP2 C.S0022-0-1, Publication Version, Date: Feb. 16, 2001, 3rd Generation Partnership Project 2 (3GPP2), Position Determination Service Standard for Dual Mode Spread Spectrum Systems, Addendum (TIA/EIA/IS-801-1).

3rd Generation Partnership Project 2 "3GPP2": "cdma2000 Packet Data Services; Wireless Local Area Network (WLAN) Inter-working," 3GPP2 X.50028-000-0, Version 1.0, pp. 1-119 (Jul. 2006).

3rd Generation Partnership Project 2 "3GPP2", Internet Article, Version 1.0 (Online), Oct. 2005, Section 4 (6 pages).

3rd Generation Partnership Project 2 "3GPP2": "TIA/EIA-41-D Location Services Enhancements," 3GPP2 X.50002, Version 1.0.0, pp. 1-234 (Mar. 2004).

3rd Generation Partnership Project; Technical Specificatiln Group GSM/EDGE Radio Access Network, "Generic access to A/Gb interface; Stage 2 (Release 6)," 3GPP TS 43.318 V6.8.0, pp. 1-71 (Nov. 2006).

3rd Generation Partnership Project; Technical Specification Group GSM/EDGE Radio Access Network, "Functional stage 2 description of Location Services (LCS) in Geran (Release 4)," 3GPP TS 43.059 V4.7.0, pp. 1-50 (Apr. 2006).

3rd Generation Partnership Project; Technical Specification Group Services and System Aspects, "3GPP system to Wireless Local Area Network (WLAN) interworking; System description (Release 6)," 3GPP TS 23.234 V6.10.0, pp. 1-75 (Sep. 2006).

3rd Generation Partnership Project; Technical Specification Group Services and System Aspects, "Functional stage 2 description of

(56) References Cited

OTHER PUBLICATIONS

Location Services (LCS)(Release 7)," 3GPP TS 23.271 V7.6.0, pp. 1-141 (Sep. 2006).
Anonymous: "Position Determination Service for cdma2000(R) Spread Spectrum Systems;(Revision of TIA/EIA/IS-801);TIA-801-A" 19000101, Apr. 2004, XP017004816 p. 2.5-p. 2.6.
Joint Standard, "Enhanced Wireless 9-1-1 Phase II (Erratum)," J-STD-036-B, pp. 1-344 (Jun. 2006).
Kikuchi T, "What's New, Not Worse Than Wired, Nikkei Electronics," Japan, Nikkei Business Publications, Inc., Mar. 31, 2003, No. 844, pp. 30-31.
Open Mobile Alliance, "Secure User Plane Location Architecture, Candidate Version 1.0," OMA-Ad-SUPL-V1_0-20060906-C, pp. 1-80 (Sep. 2006).
Orville R.E., "Development of the National Lightning Detection Network," BAMS, Feb. 2008, 11 pages.
Suzuki Y, "Technologies of Internet Access Communication," Information Processing, Japan, The Information Processing Society of Japan, Apr. 2002, vol. 43, No. 4, pp. 462-467.
Universal Mobile Telecommunications System (UMTS); Radio Resource Control (RRC); Protocol specification (3GPP TS 25.331 version 5.18.0 Release 5) ETSI TS 125 331 V5.18.0, pp. 1-1047 (Sep. 2006).

* cited by examiner

WIRELESS NETWORK HYBRID POSITIONING

This application claims priority to and is a divisional of U.S. patent application Ser. No. 13/354,235, filed Jan. 19, 2012, which claims priority to and is a continuation of U.S. patent application Ser. No. 10/877,205, filed Jun. 25, 2004, which claims the benefit of U.S. Provisional Patent Application Ser. No. 60/483,094, filed Jun. 27, 2003, each of which is expressly incorporated by reference herein.

FIELD OF THE INVENTION

The invention relates to position determination systems, and more particularly, to hybrid positioning using wireless communication signals.

BACKGROUND

To perform position location in wireless cellular networks (e.g., a cellular telephone network), several approaches perform trilateration based upon the use of timing information sent between each of several base stations and a mobile device, such as a cellular telephone. One approach, called Advanced Forward Link Trilateration (AFLT) in CDMA or Enhanced Observed Time Difference (EOTD) in GSM or Observed Time Difference of Arrival (OTDOA) in WCDMA, measures at the mobile device the relative times of arrival of signals transmitted from each of several base stations. These times are transmitted to a Location Server (e.g., a Position Determination Entity (PDE) in CDMA), which computes the position of the mobile device using these times of reception. The transmit times at these base stations are coordinated such that at a particular instance of time, the times-of-day associated with multiple base stations are within a specified error bound. The accurate positions of the base stations and the times of reception are used to determine the position of the mobile device.

FIG. 1 shows an example of an AFLT system where the times of reception (TR1, TR2 and TR3) of signals from cellular base stations 101, 103 and 105 are measured at the mobile cellular telephone 111. This timing data may then be used to compute the position of the mobile device. Such computation may be done at the mobile device itself or at a location server if the timing information so obtained by the mobile device is transmitted to the location server via a communication link. Typically, the times of receptions are communicated to a location server 115 through one of the cellular base stations (e.g., base station 101, 103 or 105). The location server 115 is coupled to receive data from the base stations through the mobile switching center 113. The location server 115 may include a base station almanac (BSA) server, which provides the location of the base stations and/or the coverage area of base stations. Alternatively, the location server 115 and the BSA server may be separate from each other; and the location server 115 communicates with the base station to obtain the base station almanac for position determination. The mobile switching center 113 provides signals (e.g., voice communications) to and from the land-line Public Switched Telephone Network (PSTN) 117 so that signals may be conveyed to and from the mobile telephone to other telephones (e.g., land-line phones on the PSTN 117 or other mobile telephones). In some cases the location server 115 may also communicate with the mobile switching center 113 via a cellular link. The location server 115 may also monitor emissions from several of the base stations 101, 103, 105 in an effort to determine the relative timing of these emissions.

In another approach, called Uplink Time of Arrival (UTOA), the times of reception of a signal from a mobile device is measured at several base stations (e.g., measurements taken at base stations 101, 103 and 105). FIG. 1 applies to this case if the arrows of TR1, TR2 and TR3 are reversed. This timing data may then be communicated to the location server 115 to compute the position of the mobile device.

Yet a third method of doing position location involves the use in the mobile device of circuitry for the United States Global Positioning Satellite (GPS) system or other Satellite Positioning Systems (SPS), such as the Russian GLONASS system and the proposed European Galileo System or a combination of satellites and pseudolites. Pseudolites are ground-based transmitters, which broadcast a PN code (similar to a GPS signal) modulated on an L-band carrier signal, generally synchronized with SPS time. Each transmitter may be assigned a unique PN code so as to permit identification by a mobile device. Pseudolites are useful in situations where SPS signals from an orbiting satellite might be unavailable, such as tunnels, mines, buildings or other enclosed areas. The term "satellite", as used herein, is intended to include pseudo lite or equivalents of pseudolites, and the term GPS signals, as used herein, is intended to include GPS-like signals from pseudolites or equivalents of pseudolites. Methods that use an SPS receiver to determine a position of a mobile station may be completely autonomous (in which the SPS receiver, without any assistance, determines the position of the mobile station) or may utilize the wireless network to provide assistance data or to share in the position calculation. Examples of such methods are described in U.S. Pat. Nos. 5,812,087; 5,841,396; 5,874,914; 5,945,944 and 6,208,290. For instance, these patents describe, among other things: a method to obtain from cellular phone transmission signals accurate time information, which is used in combination with SPS signals to determine the position of the receiver; a method to transmit the Doppler frequency shifts of in-view satellites to the receiver on the mobile device through a communication link to determine the position of the mobile device; a method to transmit satellite almanac data (or ephemeris data) to a receiver through a communication link to help the receiver to determine its position; a method to lock to a precision carrier frequency signal of a cellular telephone system to provide a reference signal at the receiver for SPS signal acquisition; a method to use an approximate location of a receiver to determine an approximate Doppler for reducing SPS signal processing time; and a method to compare different records of a satellite data message received to determine a time at which one of the records is received at a receiver in order to determine the position of the receiver. In practical low-cost implementations, both the mobile cellular communications receiver and the SPS receiver are integrated into the same enclosure and may in fact share common electronic circuitry.

In yet another variation of the above methods, the round trip delay (RTD) is found for signals that are sent from the base station to the mobile device and then are returned. In a similar, but alternative, method the round trip delay is found for signals that are sent from the mobile device to the base station and then returned. Each of these round-trip delays is divided by two to determine an estimate of the one-way propagation delay. Knowledge of the location of the base station, plus a one-way delay constrains the location of the mobile device to a circle on the earth. Two such measurements from distinct base stations then result in the intersection of two circles, which in turn constrains the location to two points on the earth. A third measurement (even an angle of arrival or cell sector identification) resolves the ambiguity.

A combination of either the AFLT or U-TDOA with an SPS system may be referred to as a "hybrid" system. For example, U.S. Pat. No. 5,999,124 describes, among other things, a hybrid system, in which the position of a cell based transceiver is determined from a combination of at least: i) a time measurement that represents a time of travel of a message in the cell based communication signals between the cell based transceiver and a communication system; and ii) a time measurement that represents a time of travel of an SPS signal.

Altitude aiding has been used in various methods for determining the position of a mobile device. Altitude aiding is typically based on a pseudo-measurement of the altitude. The knowledge of the altitude of a location of a mobile device constrains the possible positions of the mobile device to a surface of a sphere (or an ellipsoid) with its center located at the center of the earth. This knowledge may be used to reduce the number of independent measurements required to determine the position of the mobile device. For example, U.S. Pat. No. 6,061,018 describes, among other things, a method where an estimated altitude is determined from the information of a cell object, which may be a cell site that has a cell site transmitter in communication with the mobile device.

SUMMARY OF THE DESCRIPTION

In one aspect of the present invention, a method of determining a position of a mobile station, the method comprising: receiving wireless signals from a first wireless network; receiving wireless signals from a second wireless network; determining timing measurements based on the wireless signals from the first wireless network and the wireless signals from the second wireless network; and determining the position of the mobile station based on the timing measurements.

In another aspect of the present invention, a method of determining a position of a mobile station, the method comprising: receiving wireless signals from a first base station in a first wireless network, wherein the mobile station is unauthorized for access to the first wireless network; receiving wireless signals from a second base station in a second wireless network, wherein the mobile station is subscribed to the second wireless network; determining a first identity of the first base station in the first wireless network; determining a second identity of the second base station in the second wireless network; transmitting the first and second base station identities to a location server having access to a base station almanac; retrieving corresponding positions of the first and second base stations based on the first and second base station identities; and determining the position of the mobile station based on the timing measurements.

In another aspect of the present invention, a mobile device for determining a position of the mobile station, the mobile device comprising: means for receiving wireless signals from a first wireless network; means for receiving wireless signals from a second wireless network; means for determining timing measurements based on the wireless signals from the first wireless network and the wireless signals from the second wireless network; and means for determining the position of the mobile station based on the timing measurements.

In another aspect of the present invention, a mobile device comprising a processor and a memory wherein the memory includes software instructions to: receive wireless signals from a first wireless network; receive wireless signals from a second wireless network; determine timing measurements based on the wireless signals from the first wireless network and the wireless signals from the second wireless network; and determine the position of the mobile station based on the timing measurements.

In another aspect of the present invention, a non-transitory computer readable medium tangibly embodying a program of machine-readable instructions executable by a digital processing apparatus to perform a method for determining a position of a mobile station having memory and a processor, said method comprising operations of: receiving wireless signals from a first wireless network; receiving wireless signals from a second wireless network; determining timing measurements based on the wireless signals from the first wireless network and the wireless signals from the second wireless network; and determining the position of the mobile station based on the timing measurements.

The present invention includes methods and apparatuses that perform these methods, including data processing systems, which perform these methods, and computer readable media that when executed on data processing systems cause the systems to perform these methods. Further, the inventions described herein may be implemented on different nodes within a system, such nodes including a mobile station, a base station (such as a wireless access point) or a location server or other nodes in a network or wireless network.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
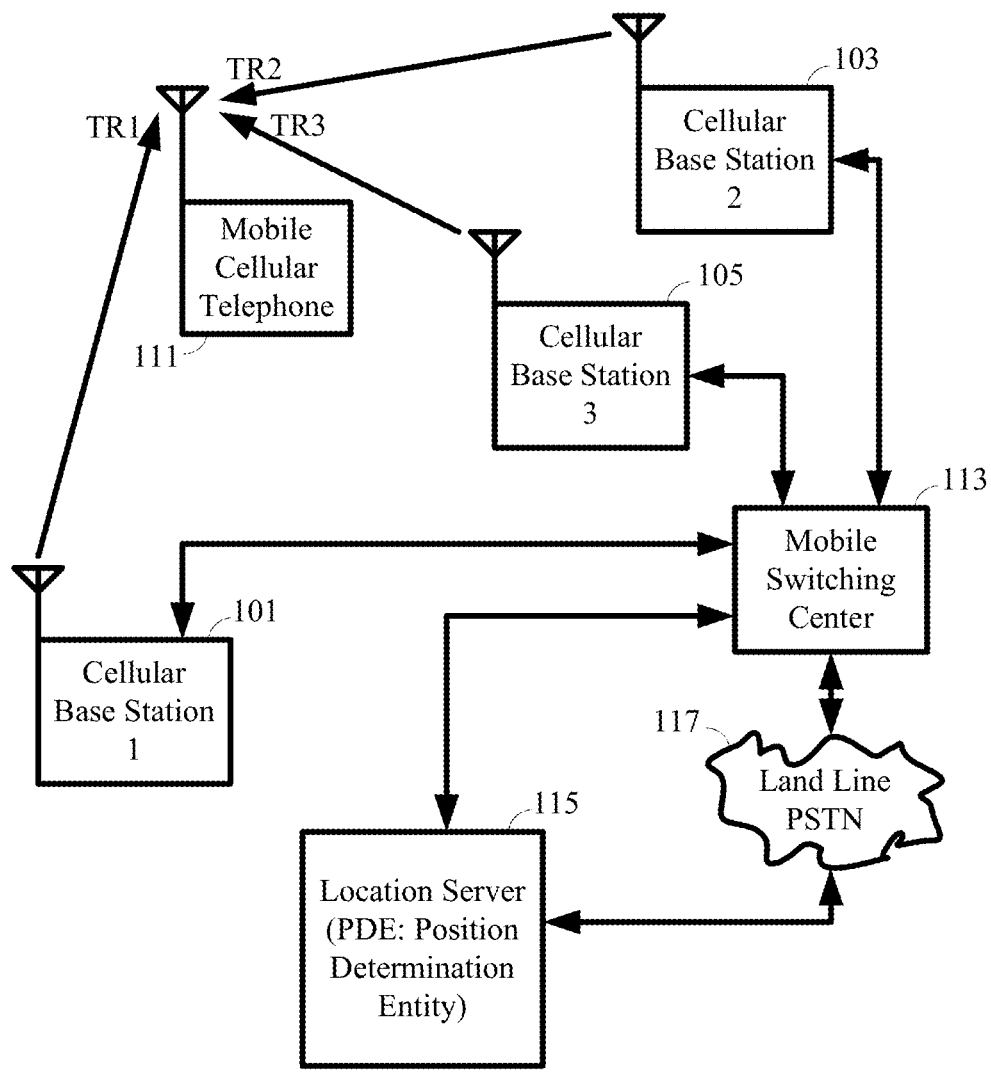
FIG. 1 shows an example of a prior art cellular network, which determines the position of a mobile cellular device.

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessary to the same embodiment; and such references mean at least one.

Recent development of wireless communication technologies leads to the deployment of various different wireless networks with substantial overlapping coverage in some areas. In the present application, a wireless network refers to a set of wireless access points (e.g., base stations) with a same air interface, operated by one service provider (e.g., Verizon Wireless or Sprint), such that a mobile unit can access the network through one of the set of the wireless access points when in the coverage area of the network; and the union of the coverage areas of the wireless access points of the wireless network is the coverage area of the network. Further, data communication refers to the transmission of data in a two-way communication system although, in certain embodiments, data communication may be a one-way communication or may include extracting information embedded in a signal, which is broadcasted regardless whether the receiver needs it or not. A wireless access point may be considered to be a cell tower or a base station or other wireless transmitter or receiver, which is coupled to a network of other nodes (for example, the wireless access point is coupled by wireless or wire line to the other nodes).

In certain areas, especially urban metropolitan areas, different wireless networks have substantially overlapping coverage. For example, different service providers may offer the same type of wireless service (e.g., cellular phone communication) in the same area. Further, different types of wireless services, such as wireless phone services (e.g., cellular phone services for data, voice or both) and wireless digital communication services (e.g., wireless local area networks such as WiFi networks, bluetooth, ultra-wideband), may have overlapping in coverage area. For example, wireless LAN (Local Area Network) access points (e.g., for an IEEE 802.11 based wireless network) may be located within the coverage areas of wireless telecommunication networks (e.g., based on Telecommunications Industry Association (TIA)/Electronic Industries Alliance (EIA) Standards, such as IS-95, IS-856 or IS-2000), such as those based on TDMA (Time Division Multiple Access), GSM (Global System for Mobile communications), CDMA (Code Division Multiple Access), WCDMA (Wideband Code Division Multiple Access), UMTS (Universal Mobile Telecommunication System), TD-SCDMA (Time Division Synchronous Code Division Multiple Access), iDEN (integrated Digital Enhanced Network), HDR (High Data Rate) or other similar cellular networks.

At least one embodiment of the present invention seeks a comprehensive system, which supports positioning using these disparate sources of wireless signals to determine measurements and to obtain aiding information (e.g., the position and the coverage area of an access point, Doppler frequency shifts for in-view SPS satellites, SPS ephemeris data) to form a flexible and ubiquitous navigation solution. In this comprehensive system, when information about an access point (e.g., base station almanac, such as the location and coverage area of the base station) is available, it is used and may be enhanced. Where it is not, the system may automatically gather and enhance such information for the benefit of future positioning attempts.

At least one embodiment of the present invention uses wireless signals transmitted from access points of more than one wireless network to combine information, such as SPS observations, wireless network observations, terrain elevation information and others, to obtain a position solution for a mobile station. In one embodiment of the present invention, a mobile station of a hybrid position system transfers information over access points of more than one wireless network (in two-way communication) to aid in the acquisition of SPS signals, time stamping for measurements and other operations at the mobile station. In one embodiment of the present invention, a mobile station of a hybrid position system performs measurements using signals from access points of different wireless networks, while communicating with a remote server using one or more of the wireless networks.

Typically, information describing the identification, location and coverage area of the sectors of a wireless network is stored in a base station almanac, which has been used in a hybrid positioning system using a single wireless network. However, when different wireless networks (e.g., different service providers or different types of networks) have overlapping coverage, a typical mobile station does not have access to such information for the access points of the different wireless networks, even though the wireless signals transmitted from the access points of the different wireless networks are in the air and available to the mobile station. This is usually because the mobile station is allowed or is authorized to have access to one wireless network but not another wireless network. One simple example of this is a cell phone that has been authorized access to a first wireless network (e.g., a cell phone network operated by a service provider such as Verizon Wireless) but has not been authorized access to a second wireless network (e.g., Sprint's cell phone network) or to a third wireless network (e.g., a Wi-Fi "hotspot").

In one embodiment of the present invention, when available, information from small and localized transmitters, such as an IEEE 802.11 wireless LAN access point, is incorporated into the wireless navigation solution. In many cases, the location information for these transmitters is not well known. In some cases, the "almanac" information describing the physical characteristics of a wireless network (e.g., ID, location and coverage area of access points) is not available to users who might like to use it. Some network providers may choose not to share such information, while still others may not have it available. In one embodiment of the present invention, information for deriving the physical characteristics of a network is gathered from mobile stations that use another wireless network for communication. In one embodiment of the present invention, using the wireless signals available in the air from different wireless networks and the abilities of the mobile station for position determination (e.g., a cell phone with a GPS receiver or with a portion of a GPS receiver), mobile stations harvest information about the access points of the different wireless networks, which in general may not be under control of an operator of a wireless network through which the mobile stations typically perform data communication. The harvested information is used to derive location information (e.g., the location, coverage area) about the access points, which can be used for aiding hybrid position determination for future position determinations.

In one embodiment of the present invention, the signals used to provide time information and/or frequency information to a mobile station are not the same as the one over which data communication transactions are carried out.

A mobile station that supports multiple wireless communication interfaces (e.g., IEEE 802.11 [and other IEEE 802 standards such as 802.15, 802.16 and 802.20], Bluetooth, UWB [Ultra-Wideband], TDMA, GSM, CDMA, W-CDMA, UMTS, TD-SCDMA, iDEN, HDR or other similar networks) is used in one embodiment of the present invention to use multiple wireless networks. Such a mobile station may have, for example, several different portions in a communication section, which support the transmission and/or reception of data for these different communication interfaces. Thus, one portion may handle the transmission and/or reception of Wi-Fi signals (e.g., IEEE 802.11 or 802.16) and another portion of the communication section may support a cellular telephone interface such as a CDMA interface. This also gives the user alternative communication paths from which to choose when deciding to communicate. For example, the availability, coverage, expense, data speed and ease of use may be considered when choosing which communication path to use.

In one embodiment of the present invention, a first wireless network is used for communications and positioning, while a second wireless network is used for positioning and optionally communications. For example, each of these wireless networks might use a completely different air interface (e.g., different TIA/EIA standards), such as an air interface that is for a typical wireless cell phone (e.g., TDMA, GSM, CDMA, W-CDMA, UMTS, TD-SCDMA, iDEN, HDR or other similar cellular networks) or some other wireless air interface, such as that in accordance with IEEE 802.11, bluetooth or UWB. A plurality of these wireless networks is used for positioning purposes, even when only one wireless network may be used for communications. The advantages of a hybrid approach according to at least some of the embodiments of the present invention include: improved redundancy for a more failsafe solution, higher positioning availability, better accuracy and faster time to fix.

Figure 2:
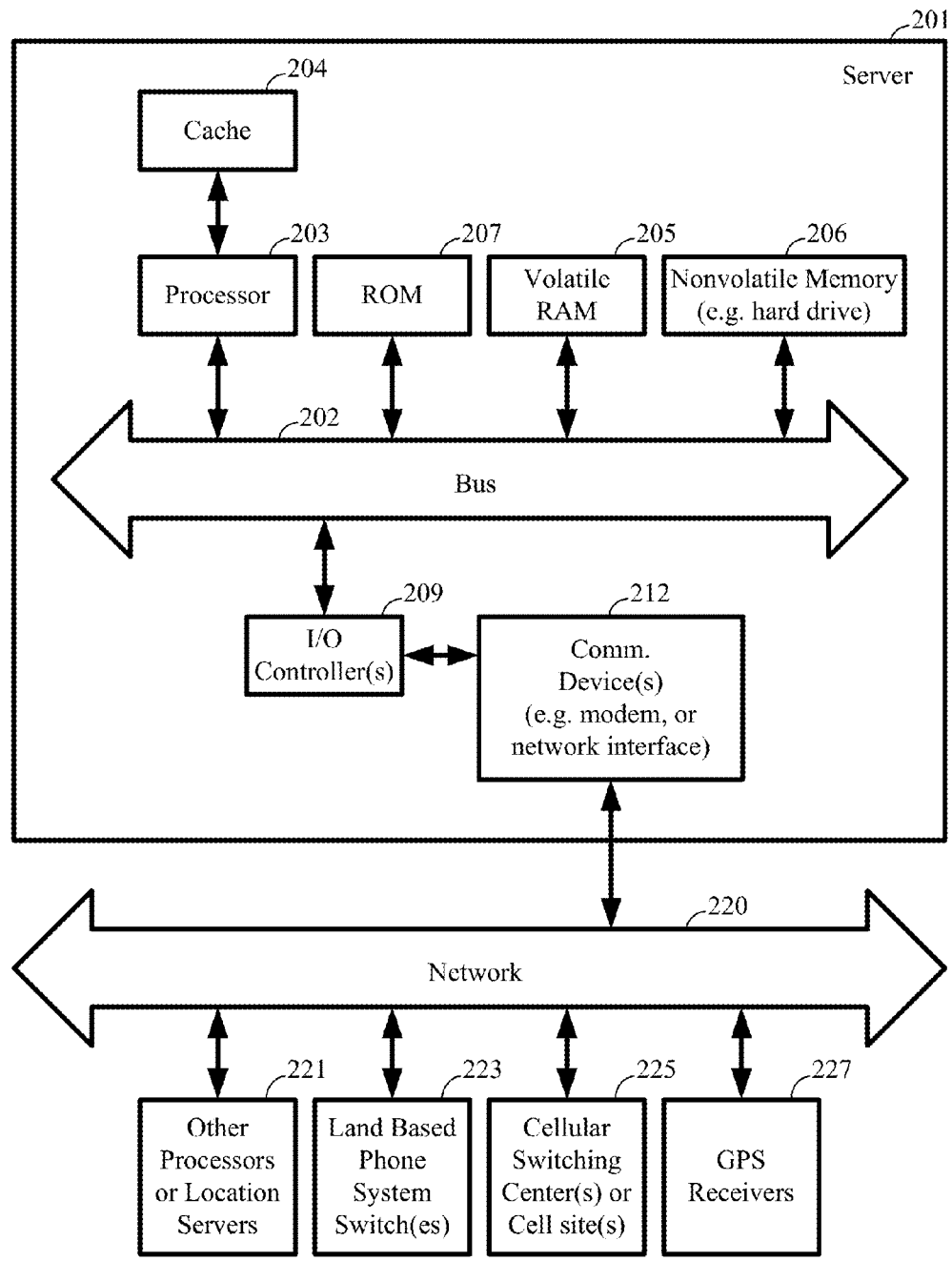
FIG. 2 shows an example of a server, which may be used with the present invention.

FIG. 2 shows an example of a data processing system, which may be used as a server in various embodiments of the present invention. For example, as described in U.S. Pat. No. 5,841,396, the server 201 may provide assistance data such as Doppler or other satellite assistance data to the GPS receiver in a mobile station. In addition or alternatively, the same server or a different server may perform the final position calculation rather than the mobile station (after receiving pseudoranges or other data from which pseudoranges can be determined from the mobile station) and then may forward this position determination result to the base station or to some other system. The data processing system as a server (e.g., a location server, an almanac server) typically includes communication devices 212, such as modems or network interface. The location server may be coupled to a number of different networks 220 through communication devices 212 (e.g., modems or other network interfaces). Such networks include one or more intranets, the network, the cellular switching center or multiple cellular switching centers 225, the land based phone system switches 223, cellular base stations (not shown in FIG. 2), GPS receivers 227 or other processors or location servers 221.

Multiple cellular base stations are typically arranged to cover a geographical area with radio coverage. These different base stations are coupled to at least one mobile switching center, as is well known in the prior art (e.g., see FIG. 1). Thus, multiple base stations would be geographically distributed but coupled together by a mobile switching center. The network 220 may be connected to a network of reference GPS receivers 227 that provide differential GPS information and may also provide GPS ephemeris data for use in calculating the position of mobile stations. The network 220 is coupled through the modem or other communication interface to the processor 203. The network 220 may be connected to other computers or network components. Also network 220 may be connected to computer systems operated by emergency operators, such as the Public Safety Answering Points, which respond to 911 telephone calls. Various examples of methods for using a location server have been described in numerous U.S. patents, including: U.S. Pat. Nos. 5,841,396, 5,874,914, 5,812,087 and 6,215,442.

The server 201, which is a form of a data processing system, includes a bus 202 which is coupled to a microprocessor 203 and a ROM 207 and volatile RAM 205 and a non-volatile memory 206. The processor 203 is coupled to cache memory 204 as shown in the example of FIG. 2. The bus 202 interconnects these various components together. While FIG. 2 shows that the non-volatile memory 206 is a local device coupled directly to the rest of the components in the data processing system, it will be appreciated that the present invention may utilize a non-volatile memory that is remote from the system, such as a network storage device, which is coupled to the data processing system through a network interface such as a modem or Ethernet interface. The bus 202 may include one or more buses connected to each other through various bridges, controllers and/or adapters as is well known in the art. In many situations the location server may perform its operations automatically without human assistance. In some designs where human interaction is required, the I/O controller 209 may communicate with displays, keyboards and other I/O devices.

Note that while FIG. 2 illustrates various components of a data processing system, it is not intended to represent any particular architecture or manner of interconnecting the components as such details are not germane to the present invention. It will also be appreciated that network computers and other data processing systems that have fewer components or perhaps more components may also be used with the present invention and may act as a location server or a PDE (position determination entity).

In some embodiments, the methods of the present invention may be performed on computer systems that are simultaneously used for other functions, such as cellular switching, messaging services, etc. In these cases, some or all of the hardware of FIG. 2 would be shared for several functions.

It will be apparent from this description that aspects of the present invention may be embodied, at least in part, in software. That is, the techniques may be carried out in a computer system or other data processing system in response to its processor executing sequences of instructions contained in memory, such as ROM 207, volatile RAM 205, non-volatile memory 206, cache 204 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the processor 203.

A machine readable medium can be used to store software and data, which when executed by a data processing system causes the system to perform various methods of the present invention. This executable software and data may be stored in various places including for example ROM 207, volatile RAM 205, non-volatile memory 206 and/or cache 204 as shown in FIG. 2. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

Figure 3:
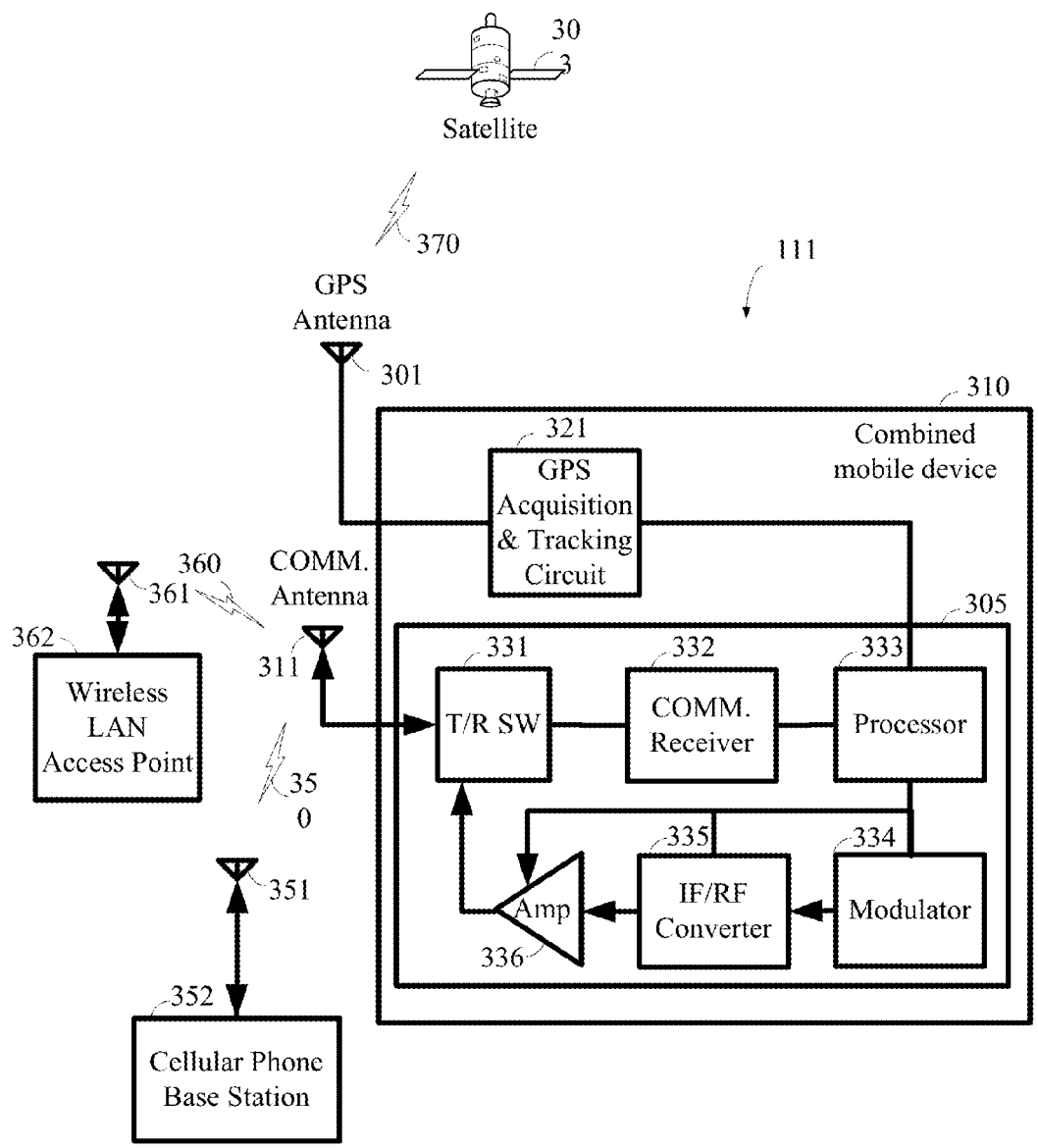
FIG. 3 shows a block diagram representation of a mobile station according to one embodiment of the present invention.

FIG. 3 shows a block diagram representation of a mobile station according to one embodiment of the present invention. The mobile station includes a portable receiver, which combines a communication transceiver with GPS receiver for use in one embodiment of the present invention. The combined mobile device 310 includes circuitry for performing the functions required for processing GPS signals as well as the functions required for processing communication signals received through a communication link. The communication link, such as communication link 350 or 360, is typically a radio frequency communication link to another component, such as base station 352 having communication antenna 351 or wireless LAN access point 362 with antenna 361. Although FIG. 3 illustrates an embodiment that communication antenna 311 is used for receiving signals from different types of wireless access points (e.g., from access point 362 for wireless LAN and from based station 352 for cellular phone service), the combined receiver may use separate and distinct antennas for receiving signals of different air interfaces. Further, the combined receiver may use separate and distinct components for at least a partial processing of the received wireless signals and may or may not share some components in the processing of the wireless signals of different air interfaces. For example, the combined receiver may have separate circuits for the RF signal processing and share same data processor resources. From this description, various combinations and variations of the combined receiver will be apparent to one skilled in the art.

Mobile device 310 is an example of a combined GPS receiver and a communication receiver and transmitter. The communication receiver and transmitter may be implemented as multiple receivers and transmitters for the different wireless networks. For example, the communication transceiver 305 may include a transceiver portion for receiving and/or transmitting cellular telephone signals and another transceiver portion for receiving and/or transmitting Wi-Fi signals. Mobile device 310 contains a GPS receiver stage including GPS acquisition and tracking circuit 321 and communication transceiver 305. GPS acquisition and tracking circuit 321 is coupled to GPS antenna 301, and communication transceiver 305 is coupled to communication antenna 311. GPS signals (e.g., signal 370 transmitted from satellite 303) are received through GPS antenna 301 and input to GPS acquisition and tracking circuit 321 which acquires the PN (pseudorandom noise) codes for the various received satellites. The data produced by GPS acquisition and tracking circuit 321 (e.g., correlation indicators) are processed by processor 333 for transmittal (e.g., of SPS pseudoranges) by communication transceiver 305. Communication transceiver 305 contains a transmit/receive switch 331 which routes communication signals (typically RF) to and from communication antenna 311 and communication transceiver 305. In some systems, a band splitting filter or "duplexer," is used instead of the T/R switch. Received communication signals are input to communication receiver 332 and passed to processor 333 for processing. Communication signals to be transmitted from processor 333 are propagated to modulator 334 and a frequency converter (IF/RF converter 335). Power amplifier 336 increases the gain of the signal to an appropriate level for transmission to base station 352 (or to wireless LAN access point 362).

In one embodiment of the present invention, communication transceiver 305 is capable of being used with a number of different air interfaces (e.g., IEEE 802.11, bluetooth, UWB, TD-SCDMA, iDEN, HDR, TDMA, GSM, CDMA, W-CDMA, UMTS or other similar networks) for communication (e.g., through communication links 350 and 360). In one embodiment of the present invention, communication transceiver 305 is capable of being used with one air interface for communication and capable of being used to receive signals with other air interfaces. In one embodiment of the present invention, communication transceiver 305 is capable of being used with one air interface for communication while also being capable of being used with signals in another air interface to extract timing indicators (e.g., timing frames or system time) or to calibrate the local oscillator (not shown in FIG. 3) of the mobile station. More details about the mobile station for extracting timing indicators or calibrating the local oscillator can be found in U.S. Pat. Nos. 5,874,914 and 5,945,944.

In one embodiment of the combined GPS/communication system of mobile device 310, data generated by GPS acquisition and tracking circuit 321 is transmitted to a server over communication link 350 to base station 352 or over communication link 360 to wireless LAN access point 362. The server then determines the location of mobile device 310 based on the data from the remote receiver, the time at which the data were measured and ephemeris data received from its own GPS receiver or other sources of such data. The location data can then be transmitted back to a receiver 332 in mobile device 310 or to other remote locations. More details about portable receivers utilizing a communication link can be found in U.S. Pat. No. 5,874,914.

In one embodiment of the present invention, the combined mobile device 310 includes (or is coupled to) a data processing system (e.g., a personal data assistant or a portable computer). The data processing system includes a bus that is coupled to a microprocessor and a memory (e.g., ROM, volatile RAM and/or non-volatile memory). The bus interconnects various components together and also interconnects these components to a display controller and display device and to peripheral devices such as input/output (I/O) devices, which are well known in the art. The bus may include one or more buses connected to each other through various bridges, controllers and/or adapters as are well known in the art. In one embodiment, the data processing system includes communication ports (e.g., a USB (Universal Serial Bus) port, a port for IEEE-1394 bus connection). In one embodiment of the present invention, the mobile station stores the locations and identifications (e.g., MAC address) of wireless access points (e.g., according to the types of the wireless access points) for extracting and enhancing the location information about the wireless access points using the memory and software program instructions stored in the memory. In one embodiment, the mobile station only stores the locations of the mobile station and identifications of the wireless access points for transmission to a server (e.g., through a communication port or a wireless communication link) when a communication connection is established.

Figure 4:
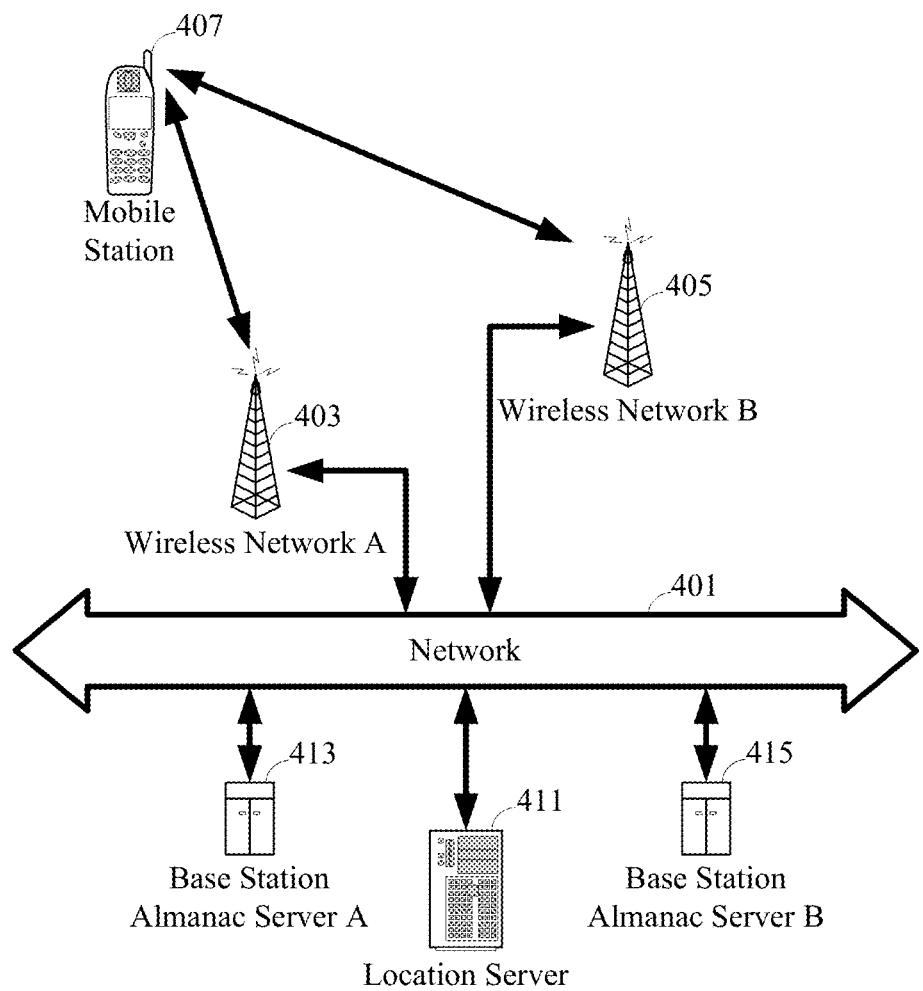
FIG. 4 shows one example of a hybrid positioning system according to one embodiment of the present invention.

FIG. 4 shows one example of a hybrid positioning system according to one embodiment of the present invention. In FIG. 4, mobile station 407 utilizes signals in the air that are transmitted from both wireless access point 403 of wireless network A and wireless access point 405 of wireless network B for position determination. In one embodiment of the present invention, the mobile station includes a receiver for receiving SPS signals from SPS satellites (e.g., GPS satellites, not shown in FIG. 4). Timing measurements (e.g., pseudorange, round trip time, times of arrival of signals or time differences of arrival of signals) based on the wireless signals from one or both of wireless networks A and B (and SPS signals) may be used to determine the position of the mobile station. It is understood that, in general, each of wireless networks A and B includes a number of access points (e.g., cellular base stations such as wireless access points 403 and 405). Wireless networks A and B may use the same type of air interface, operated by different service providers or they may operate with the same communication protocols but at different frequencies. However, wireless networks A and B may also use different types of air interfaces (e.g., TDMA, GSM, CDMA, WCDMA, UMTS, TD-SCDMA, iDEN, HDR, bluetooth, UWB, IEEE 802.11 or other similar networks), operated by the same service provider or by different service providers.

In one embodiment of the present invention, the position determination is performed at location server 411 shown in the example depicted in FIG. 4. Mobile station 407 communicates the information extracted from the observed SPS signals (e.g., SPS pseudorange measurements and/or a record of an SPS message for comparison to determine a time of signal reception) and the information extracted from the observed wireless signals (e.g., the identification of an access point, round trip or one-way time measurements between mobile station 407 and at least one of the wireless access points and received signal levels) to the location server through one of the wireless networks, such as wireless network A (e.g., when the mobile station is a subscriber of wireless network A but not a subscriber of wireless network B). Servers 413 and 415 maintain the almanac data for wireless networks A and B respectively. This almanac data may simply be, in one exemplary implementation, a database listing a latitude and longitude for each wireless access point, which is specified by an identification information (e.g., MAC address or cell tower identifier, etc.). Location server 411 uses the information communicated from the mobile station and the data in the almanac servers 413 and 415 to determine the position of the mobile station. The location server 411 may determine the location of the mobile station in a number of different ways. It may, for example, retrieve from servers 413 and 415 the locations of wireless access points 403 and 405 and use those locations and the range measurements, which indicate a distance between the mobile station 407 and the points 403 and 405, and the SPS pseudorange measurements and SPS ephemeris information to calculate a position of the mobile station 407. U.S. Pat. No. 5,999,124 provides a discussion of how range measurements from a single wireless network and SPS pseudorange measurements may be combined to calculate a position of a mobile station. Alternatively, the location server 411 may use only terrestrial range measurements (or other types of measurements such as signal strength measurements) to multiple wireless access points of multiple wireless networks to calculate the position if many (e.g., more than 3) such range measurements can be made; in this case, there is no need to obtain SPS pseudoranges or SPS ephemeris information. If SPS pseudoranges to SPS satellites are available, these pseudoranges can be combined with SPS ephemeris information, obtained either by the mobile station or by a collection of GPS reference receivers as described in U.S. Pat. No. 6,185,427, to provide additional information in the position calculations.

Network 401 may include local area networks, one or more intranets and the Internet for the information exchange between the various entities. It is understood that servers 411, 413 and 415 may be implemented as a single server program or different server programs in a single data processing system or in separate data processing systems (e.g., maintained and operated by different service providers).

In one embodiment of the present invention, different service providers operate wireless networks A and B, which are used by the mobile station for position determination. A typical mobile station is a subscriber only to one of them, and thus the mobile station is authorized to use (and to have access to) only one wireless network. However, it is often still possible to at least receive signals from the wireless network that is not subscribed to and thus it is still possible to make range measurements or signal strength measurements relative to wireless access points in the wireless network that is not subscribed to. One specific example of this situation would involve a user of a tri-mode CDMA cellular phone, which can receive PCS frequency band signals (e.g., from the wireless network operated by Sprint, which is a first service provider) and can also receive other CDMA signals at other frequencies (such as, for example, from the wireless network operated by Verizon Wireless, which is a second service provider). If the user has subscribed only to Sprint's wireless network, then the user's phone (a form of a mobile station) is authorized to operate with Sprint's wireless network but not Verizon's wireless network. The user may use the phone in an environment in which only one Sprint wireless access point (e.g., a Sprint cellular base station) is capable of radio communication with the user's phone, but in this environment there are numerous Verizon wireless access points that are within radio communication range of the user's phone. In this context, it is still possible for the phone to obtain SPS assistance data (if desired) from a location server through Sprint's wireless network and to transmit SPS pseudoranges, obtained at the phone, to the location server. However, it will not be possible to obtain more than one range measurement to a wireless access point unless range measurements to Verizon's wireless access points are obtained. With an embodiment of the invention, the phone obtains range measurements to the available Verizon wireless access points, thereby providing at least a few range measurements (e.g., distances between the phone and two Verizon cellular base stations) which can be used in the position calculations that are performed to determine the position of the phone.

The service providers maintain the almanac information on servers 413 and 415 separately. Although mobile station 407 has communication access to only one of the wireless networks, location server 411 may have access to both servers 413 and 415 for base station almanac data. After determining the identities of base stations (e.g., the wireless access points 403 and 405) of both wireless networks A and B, the mobile station 407 transmits the base station identifications to location server 411, which uses servers 413 and 415 to retrieve the corresponding positions of the base stations, which can be used in determining the position of the mobile station.

Alternatively, the cooperation between the service providers to share almanac data is not necessary. For example, the operator of location server 411 maintains both almanac servers 413 and 415 (e.g., through a survey process to obtain the almanac data or through a data harvesting process using mobile stations, which will be described in detail with FIGS. 6 and 7 and 10).

In one embodiment of the present invention, mobile station 407 uses both wireless networks A and B for communicating with the location server (instead of using only one of the wireless networks for communication purpose). As known in the art, various types of information can be exchanged between the mobile station and the location server for position determination. For example, location server 411 can provide the mobile station 407 with Doppler frequency shift information for in-view satellites of the mobile station (e.g., through wireless network A); and the mobile station can provide pseudorange measurements for SPS signals, the identification information of the base stations and associated range measurements (e.g., round trip time measurements) to the location server for the calculation of the position of the mobile station (e.g., through wireless network B). In one embodiment of the present invention, a mobile station is capable of communicating through more than one wireless network to the location server when in the coverage area of these wireless networks. However, the trade-off between cost and performance may dictate communication with the server using one of the wireless networks, while using the others only for timing measurements (or other measurements, such as received signal levels) or for aiding in measurement, such as obtaining time information from wireless transmission from an access point for time stamping measurements (e.g., for resolving ambiguity) or locking to the accurate carrier frequency of a wireless cellular base station for calibrating the local oscillator of the mobile station.

In one embodiment of the present invention, the location of the mobile station is determined at the location server using the information communicated from the mobile station and then transmitted back to the mobile station. Alternatively, the position calculation can be performed at the mobile station using assistance information from the location server (e.g., Doppler frequency shifts for in-view satellites, positions and coverage areas of access points, differential GPS data and/or altitude aiding information).

Figure 5:
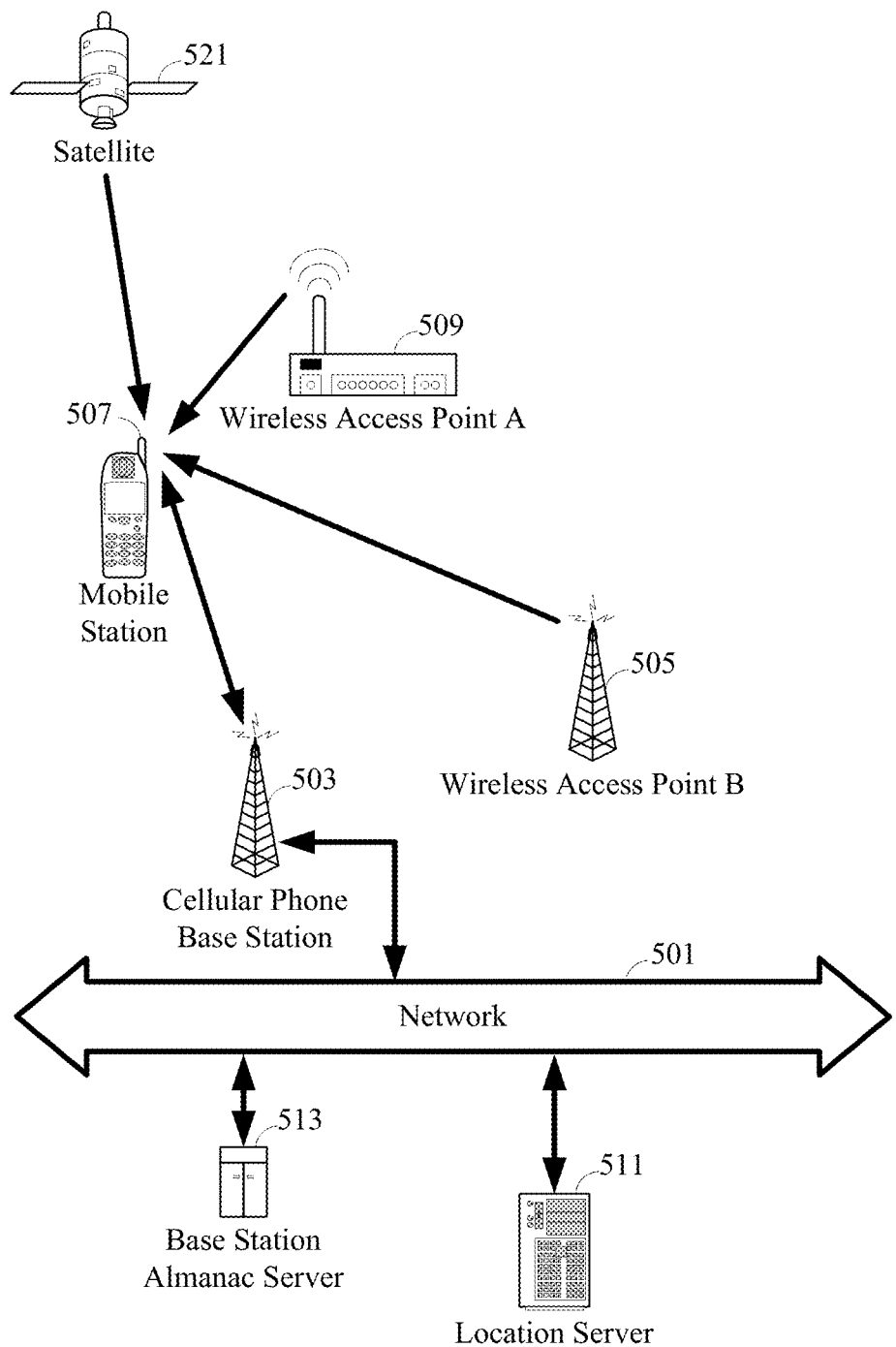
FIG. 5 shows another example of a hybrid positioning system according to one embodiment of the present invention.

FIG. 5 shows another example of a hybrid positioning system according to one embodiment of the present invention. An access point of one wireless network (e.g., cellular base station 503) is used for the communication between mobile station 507 and location server 511. A method for determining the position of mobile station 507 may use SPS signals (e.g., from satellite 521), wireless signals from access points of the wireless network used for data communication (e.g., cellular phone base station 503), wireless signals from access points of other wireless networks (e.g., wireless access point B 505, which can be a base station of a different wireless cellular phone network such as operated by a different service provider or using a different air interface) and/or wireless signals from LAN access points (e.g., access point A 509 such as a Bluetooth access point or a Wi-Fi wireless access point).

Typically, a wireless LAN access point (or other similar low power transmitters) has a small coverage area. When available, the small coverage area of such an access point provides a very good estimate of the location of the mobile station. Further, wireless LAN access points are typically located near or inside buildings, where the availability of other types of signals (e.g., SPS signals or wireless telephone signals) may be low. Thus, when such wireless transmissions are used with other types of signals, the performance of the positioning system can be greatly improved.

In one embodiment of the present invention, the wireless signals from different wireless networks are used for position determination. For example, the wireless signals from the different wireless networks can be used to determine the identities of the corresponding access points, which are then used to determine the locations and coverage areas of the corresponding access points. When precision range information (e.g., round trip time or signal traveling time between an access point and the mobile station) is available, the range information and the location of the access point can be used in obtaining a hybrid positioning solution. When approximate range information (e.g., received signal level, which can be approximately correlated with an estimated range) is available, the location of the access point can be used to estimate the position of the mobile station (or determine the estimated altitude of the mobile station). Further, the mobile station can use precision carrier frequency from one of the wireless networks (e.g., from access point 505 or 509), which may not be the one used for the data communication purpose, to calibrate the local oscillator of the mobile station. More details about locking to a precision carrier frequency of a wireless signal to provide a reference signal at an SPS receiver for signal acquisition can be found in U.S. Pat. No. 5,874,914. Further, the mobile station can use the accurate time information in the wireless signals from one of the wireless networks (e.g., from access point 505 or 509), which may not be the one used for the data communication purpose. More details about using the accurate time information (e.g., timing markers or system time) for time stamping can be found in U.S. Pat. No. 5,945,944.

Figure 6:
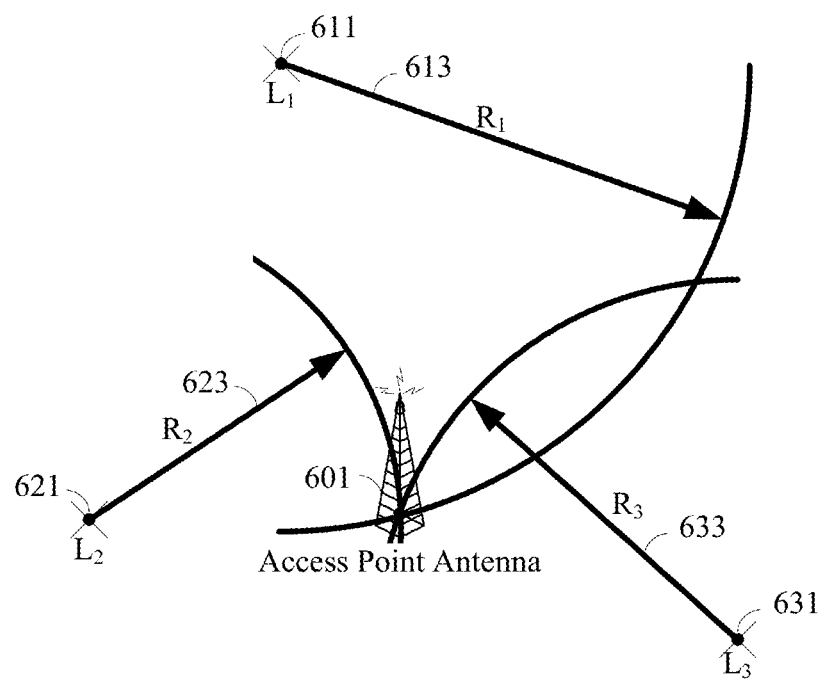
FIG. 6 illustrates one method to determine the position of a wireless access point according to one embodiment of the present invention.

Since some of the access points of the different wireless networks do not have well-known almanac data (e.g., position of the wireless access point and/or coverage area of the wireless access point), one embodiment of the present invention derives the almanac data from the information collected from mobile stations. FIG. 6 illustrates one method to determine the position of a wireless access point according to one embodiment of the present invention. In FIG. 6, a location server does not know the position of access point antenna 601. To calculate the position of the access point, the location server correlates the positions of one or more mobile stations and their corresponding ranges to the access point, which are obtained from the mobile stations while performing position determination for the mobile stations. For example, a mobile station at position $L_1$ 611 determines range $R_1$ 613 to access point antenna 601. The mobile station obtains measurements based on SPS signals (e.g., measurements of SPS pseudoranges and extraction of SPS ephemeris information from SPS signals) and wireless transmissions (e.g., range measurements). The mobile station may calculate its position using the measurements and transmit to the location server the calculated position with: i) the range to the access point antenna; and ii) the identity of the access point antenna. Alternatively, the mobile station may transmit: i) the measurements; ii) the range to the access point antenna; and iii) the identity of the access point antenna to the location server, which calculates the position of the mobile station using the measurements and which stores the range measurements (e.g., $R_1$, $R_2$ and $R_3$ and the corresponding positions (e.g., $L_1$, $L_2$ and $L_3$). When a number of data points are available, each of which data points correlates the position of a mobile station and the range from the mobile station to the access point antenna, the location server determines the position of the access point antenna. It can be seen from FIG. 6 that as few as three range measurements ($R_1$, $R_2$ and $R_3$) and their corresponding positions ($L_1$, $L_2$ and $L_3$) are sufficient to specify a particular location of the identified access point (which is shown at the intersection of three circles specified by the three ranges). Various methods that have been used in the art for calculating the position of a mobile station based on range information can be used to calculate the position of the access point. Note that the data points may be from a single mobile station or from a number of mobile stations.

Further, the accumulated data points of the locations of mobile stations show the coverage area of the access point (e.g., in a scatter plot of the mobile locations). When the position of the access point is not known, the collected data points can be used to estimate the position and the coverage of the access point. When an initial estimation of the position of the access point is available, the collected data points can be used to improve the estimation. The collection and enhancement process can be a continuous process during the service of the location server. Note that the collection and enhancement operations can also be performed on a different server other than the location server. For example, in one embodiment of the present invention, the collection and enhancement operations are performed in almanac server 513, which communicates with location server 511 in performing hybrid position determination for mobile stations.

Figure 7:
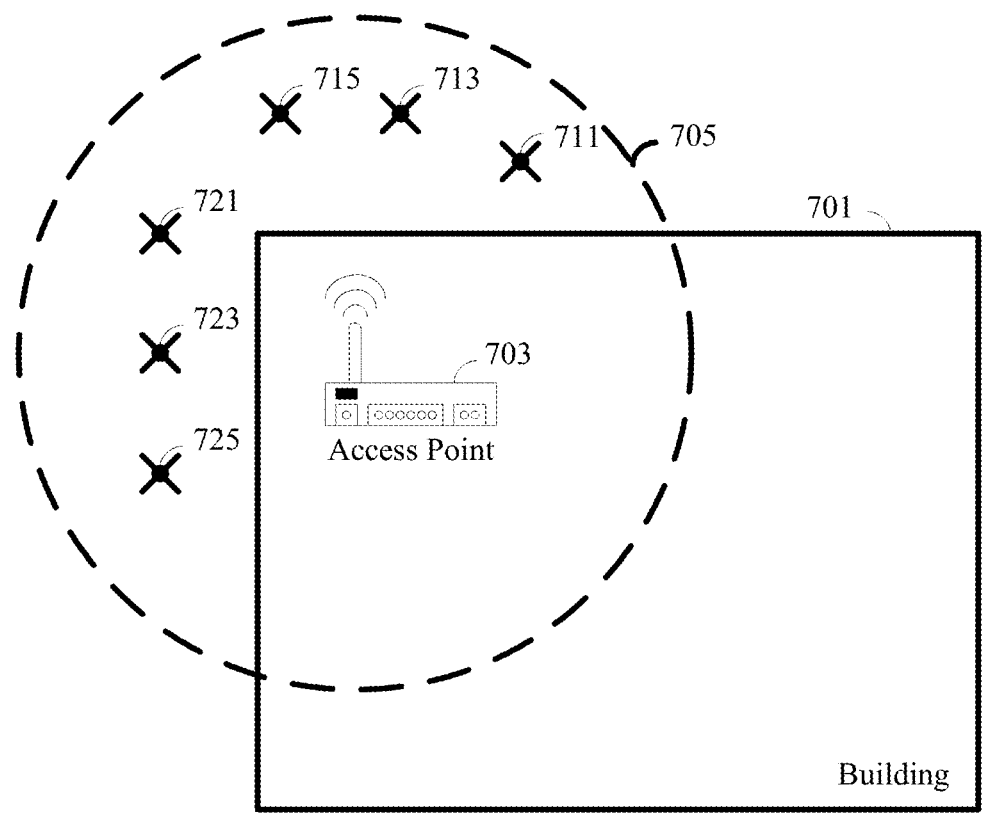
FIG. 7 illustrates another method to determine the position information of a wireless access point according to one embodiment of the present invention.

However, precision information of range to some access points may not be available to mobile stations of a location server 511. FIG. 7 illustrates another method to determine the position information of a wireless access point according to one embodiment of the present invention. A larger number of data points (e.g., 711, 713, 715, 721, 723, 725) of the locations of mobile stations that can receive signals from the access point (e.g., 703) define a coverage area (e.g., 705) of the access point (e.g., through a scatter plot of the locations or the smallest circle enclosing the data points). From the coverage area, the location server can calculate an estimated position of the access point (e.g., the geometric center of the coverage area). Further, range information (e.g., an indicator of the received signal level and/or a round trip time) may be used to define a weight for determining the weighted average of the coverage area (e.g., the closer to the access point, the larger the weight), from which the estimated position of the access point is determined. Further, in one embodiment, the location server determines the probability of a mobile station being at a particular location from the statistics of the mobile stations, given certain range information is specified. Other information, such as the signal level of wireless transmission from other transmitters, can then be further used to narrow the possible locations of the mobile station.

For example, a wireless LAN access point is located inside building 701. While SPS signals (e.g., signals from SPS satellites 741-745) and wireless cellular phone signals (e.g., signals from cellular base station 751) may be weak inside building 701, the position of a mobile station can be easily determined (e.g., without using the signals from access point 703) at certain locations around the building (e.g., locations 711-725, which may be just outside the building or at certain locations inside the building, such as spots close to windows). In one embodiment of the present invention, the identification of the access point is determined and sent to the server with the location of the mobile station (or information specifying the location of the mobile, such as pseudoranges to in-view satellites) for the determination of the coverage area (and/or the position) of the access point 703. The location information of the access point (e.g., coverage area and/or position) can be maintained at the server (or a different server). When a mobile station is inside a building (or at a position near the building), where the blockage of some of the SPS signals and cellular phone signals occurs, the location information about the access point can be used to aid in determining the position of the mobile station.

It is understood that some access points may be moved from one location to another. In one embodiment of the present invention, the server tracks the collected position information about one or more mobile stations that receive the transmission from one access point in order to determine if the access point is moved. For example, the server may compare the old coverage area with the recent coverage area (e.g., through comparing the center and the radius of the coverage area) to determine if the access point is moved. Alternatively, the server may periodically discard old information in view of newly collected information. Further, the server may weight the collected information so that the freshly collected data carries more weight in determining the coverage area and/or the location of the access point and the influence from the data collected previously may eventually diminish over time. Further, the server may determine if an access point moves frequently; and, if the access point moves frequently, the access point may be disqualified as a reference point for the position determination. Further, in one embodiment, when an access point has not been observed for a certain period of time, the access point is removed from the database; similarly, when a new access point is observed, it is added to the database. Thus, the server may update the information about the access point in an ongoing basis.

In at least one embodiment of the present invention, a mobile station can determine its position without a communication link. The mobile station has memory for storing at least some of the information about the locations of the mobile station and the corresponding received signal levels or range measurements of a number of wireless access points (e.g., for cellular phone access or for wireless LAN access). The mobile station transmits the data to a server when a communication link (e.g., a wire connection through a communication port of the mobile station or a wireless connection through a transceiver of the mobile station) is available. Alternatively, the mobile station may directly use the stored information to derive the position information about the access point in determining its own position when needed.

Figure 8:
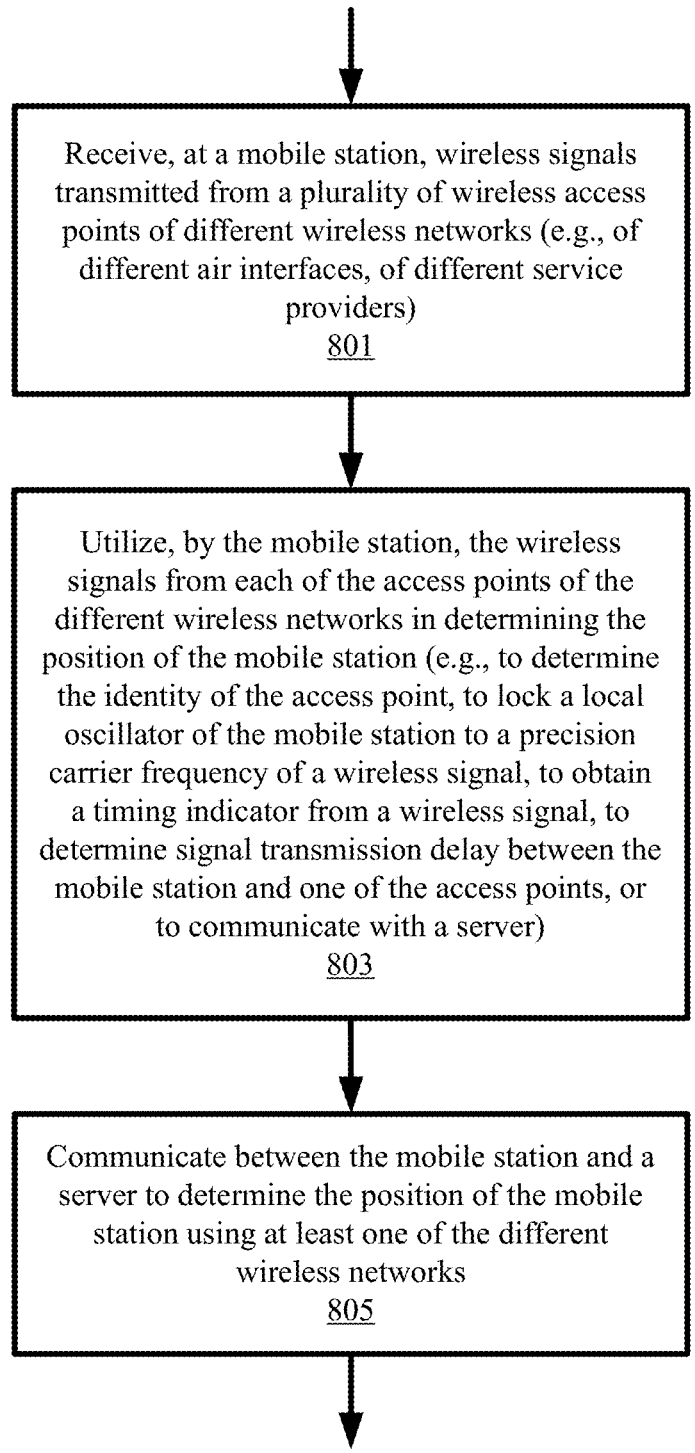
FIG. 8 shows a method of hybrid position determination using a plurality of wireless networks according to one embodiment of the present invention.

FIG. 8 shows a general method of hybrid position determination using a plurality of wireless networks according to one embodiment of the present invention. In operation 801, a mobile station receives wireless signals transmitted from a plurality of wireless access points of different wireless networks (e.g., wireless networks of different air interfaces, wireless networks of different service providers, wireless networks operating at different frequencies, wireless networks using different communication protocols, etc.). In operation 803, the mobile station utilizes the wireless signals from each of the access points of the different wireless networks in determining the position of the mobile station (e.g., to determine the identity of the access point, to lock a local oscillator of the mobile station to a precision carrier frequency of a wireless signal, to obtain a timing indicator from a wireless signal, to determine signal transmission delay between the mobile station and one of the access points and/or to communicate with a server). In general, the mobile station may use the wireless signals from access points of different wireless networks to perform different operations, although the mobile station may use the wireless signals from access points of some different wireless networks to perform a number of similar operations. In operation 805, the mobile station communicates with a server to determine the position of the mobile station using at least one of the different wireless networks. Typically, the mobile station communicates with the server using only one of the different wireless networks; however, the mobile station may communicate with the server using more than one wireless network (e.g., to transmit the time of reception at an access point for a signal transmitted from the mobile station, to transmit a round trip time or to transmit other information to or from a location server).

Figure 9:
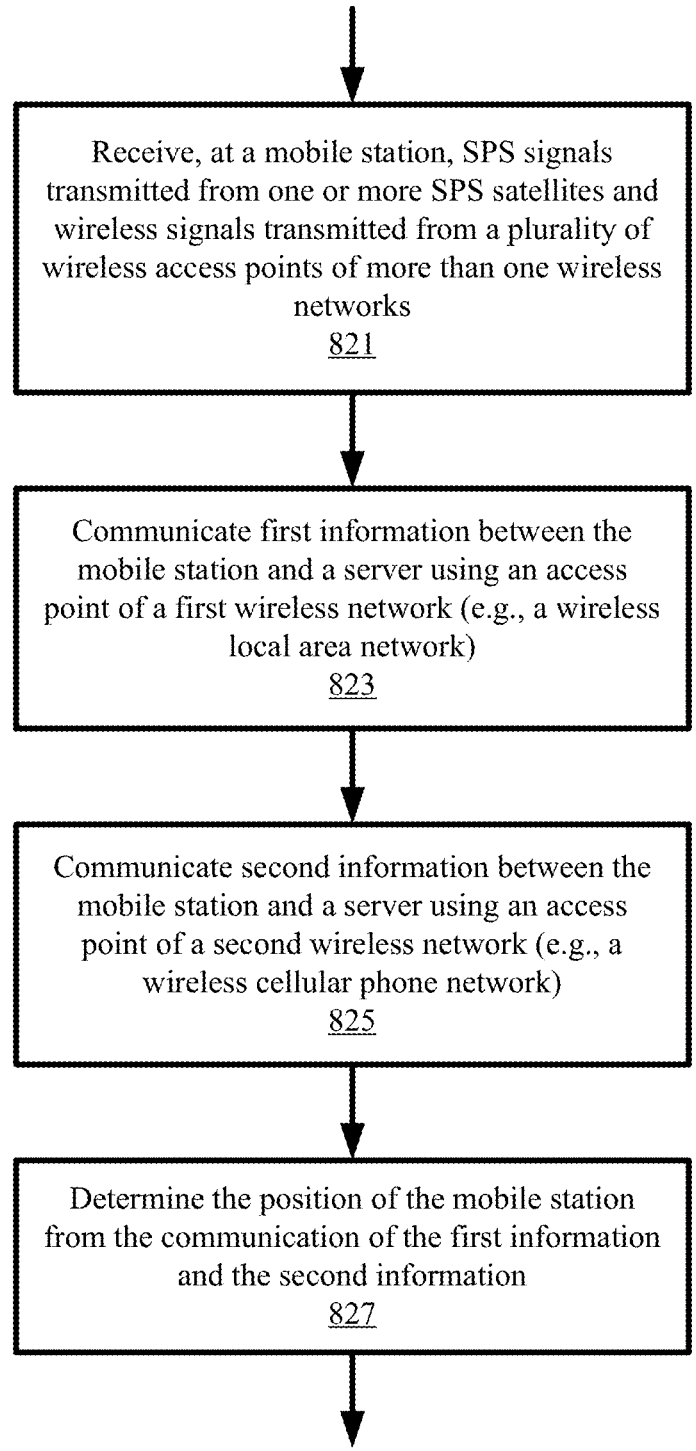
FIG. 9 shows a method of hybrid position determination using two wireless networks for communication with a server according to one embodiment of the present invention.

FIG. 9 shows a method of hybrid position determination using two wireless networks for communication with a server according to one embodiment of the present invention. Operation 821 receives, at a mobile station, SPS signals transmitted from one or more SPS satellites and wireless signals transmitted from a plurality of wireless access points of more than one wireless network. The mobile station may use the received wireless signals from one or more wireless networks to aid in SPS signal acquisitions (e.g., to extract Doppler frequency shifts for in-view satellites of the mobile station, to calibrate the local oscillator of the mobile station and/or to obtain a timing indicator to time stamp a measurement). The mobile station uses the SPS signals to determine pseudoranges to in-view satellites and wireless signals from the wireless access points to identify the access points and to perform range measurements to the wireless access points for position determination. These received signals are typically broadcast from the transmitters of the satellites and wireless access points and available to any mobile station that chooses to use them. Operation 823 communicates first information (e.g., a record of an SPS message) between the mobile station and a server using an access point of a first wireless network (e.g., a wireless local area network). Operation 825 communicates second information (e.g., Doppler frequency shifts, ephemeris data for in-view SPS satellites) between the mobile station and a server using an access point of a second wireless network (e.g., a wireless cellular phone network). Operation 827 determines the position of the mobile station from the communication of the first information and the second information. Typically, the availability, coverage, expense, data speed and ease of use are considered when choosing which communications path to use. Further, the mobile station may use different communication paths at different locations. For example, when the mobile station is within the coverage area of a wireless LAN (e.g., a home network), the mobile station may use the wireless LAN (e.g., through the internet) to communicate with the server for information that does not need to pass through the base station of a wireless cellular phone system (e.g., Doppler frequency shifts); and use the base station of the wireless cellular phone system to transmit the information that is related to the base station (e.g., round trip time measurement to the base stations of the wireless cellular phone system). In a further example, the mobile station may choose to use either the wireless cellular phone system or the wireless LAN for communication according to the communication cost and availability. In one embodiment of the present invention, the mobile station automatically determines the communication path according to a set of rules (e.g., availability, cost, priority and others) which may be specified by a user of the mobile station or may be set as a default setting by one of the wireless networks.

Figure 10:
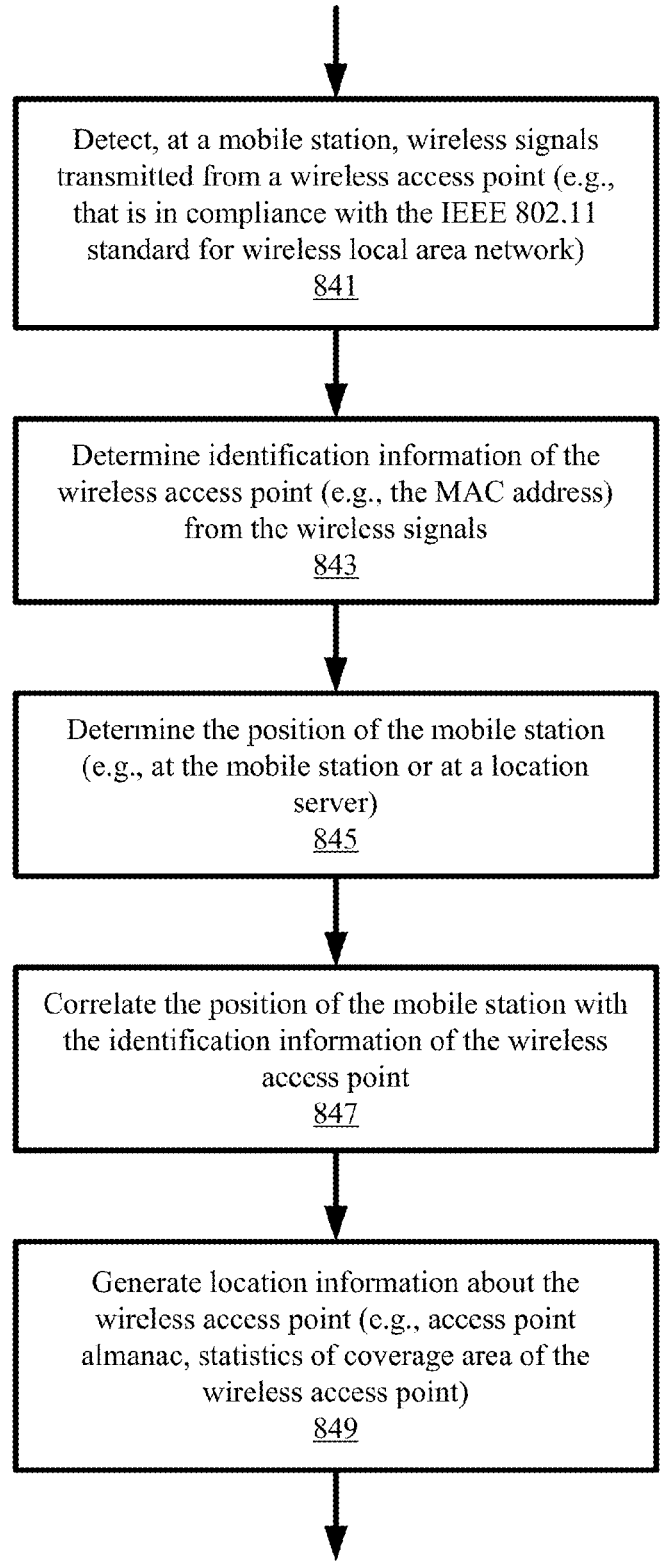
FIG. 10 shows a method to generate location information about a wireless access point according to one embodiment of the present invention.

FIG. 10 shows a method to generate location information about a wireless access point according to one embodiment of the present invention. Operation 841 detects, at a mobile station, wireless signals transmitted from a wireless access point (e.g., a wireless access point that is in compliance with the IEEE 802.11 standard for wireless local area network or other types of ground-based wireless transmitters that transmit signals with their identification information). Note that, in the present application, wireless access points do not include satellite-based transmitters. Operation 843 determines identification information, which may be a unique identifier, of the wireless access point (e.g., the MAC address of the wireless access point or an identifier of a cellular base station) from the wireless signals. Operation 845 determines the position of the mobile station (e.g., at the mobile station or at a location server). For example, the mobile station may calculate the position based on the pseudorange measurements and other range information; or, the mobile station may transmit the pseudorange measurements and the range information to a location server, which calculates the position of the mobile station (and the location server may send back the calculated position to the mobile station). Operation 847 correlates the position of the mobile station with the identification information of the wireless access point. This correlation may be transmitted to a location server so that future positioning operations of mobile stations may use the position and identification information to determine a position of the identified wireless access point. Operation 849 generates location information about the wireless access point (e.g., access point almanac, statistics of coverage area of the wireless access point). Typically, the correlation data is sent to a server (e.g., a location server or an access point almanac server) which generates location information about the access point based on a number of positions of one or more mobile stations that report the reception of signals transmitted from the access point. The location information about the wireless access point can be derived from a weighted average method as described above (or other methods, such as, using the range information as shown in FIG. 6). However, a mobile station may also track the correlation and derive the location information about the wireless access point (e.g., from data points collected at different time instances). The location information about the wireless access point can then be used for position determination.

Figure 11:
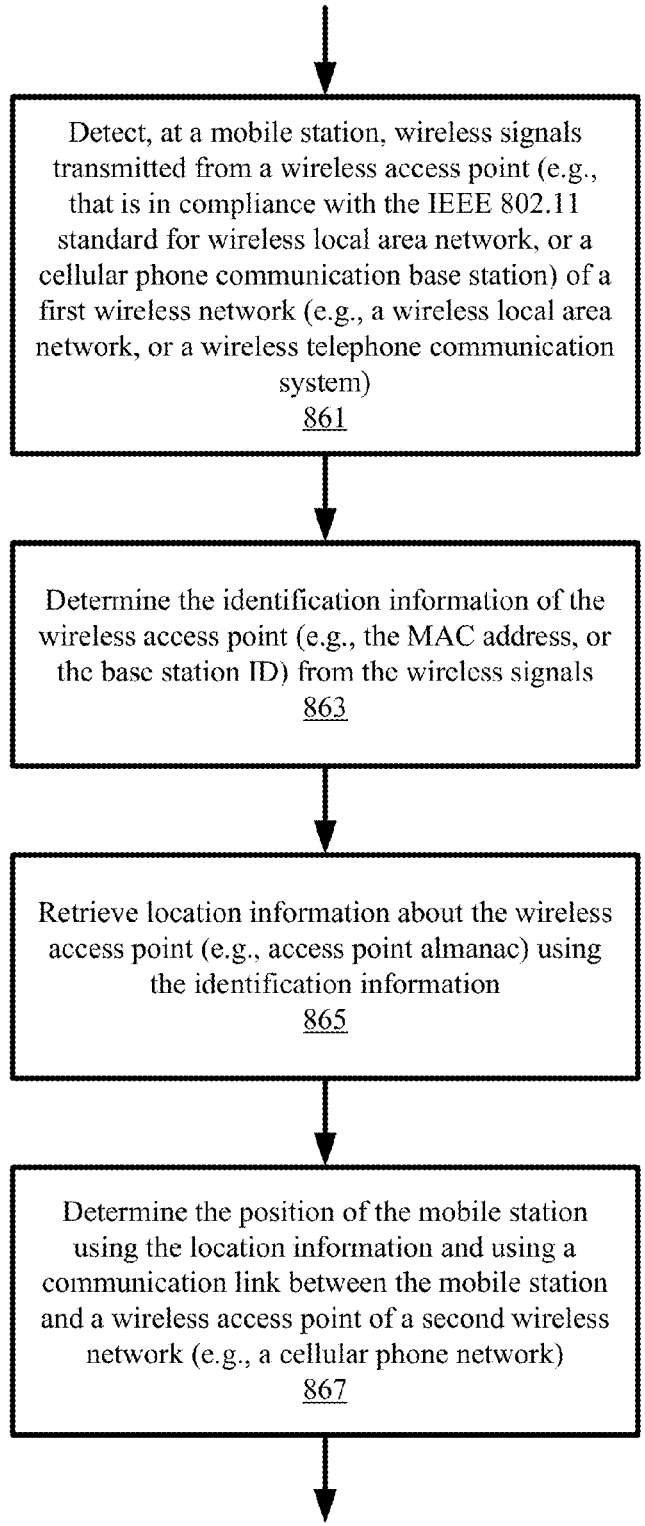
FIG. 11 shows a hybrid position determination method using one wireless network for communication and another wireless network for the measurement of positioning parameters according to one embodiment of the present invention.

FIG. 11 shows a hybrid position determination method using one wireless network for communication and another wireless network for the measurement of positioning parameters according to one embodiment of the present invention. Operation 861 detects, at a mobile station, wireless signals transmitted from a wireless access point (e.g., a wireless access point that is in compliance with the IEEE 802.11 standard for wireless local area network or a cellular communication base station) of a first wireless network (e.g., a wireless local area network or a cellular phone communication system). Operation 863 determines the identification information of the wireless access point (e.g., the MAC address or the base station ID) from the wireless signals. Operation 865 retrieves location information about the wireless access point (e.g., access point almanac) using the identification information. For example, the mobile station may transmit identification information of the wireless access point to location server, which retrieves the location information about the wireless access point using the identification information (e.g., from a database or from another server, such as an access point almanac server). In another example, the mobile station maintains the location information about the wireless access point in memory; thus, the location information is simply retrieved from the memory of the mobile station. Operation 867 determines the position of the mobile station using the location information and using a communication link between the mobile station and a wireless access point of a second wireless network (e.g., a cellular phone network). For example, satellite assistance data (e.g., Doppler frequency shifts) for the acquisition of SPS signals or timing measurements (e.g., pseudoranges or time of arrivals of SPS signals) are communicated through the second wireless network for the determination of the position of the mobile station.

Figure 12:
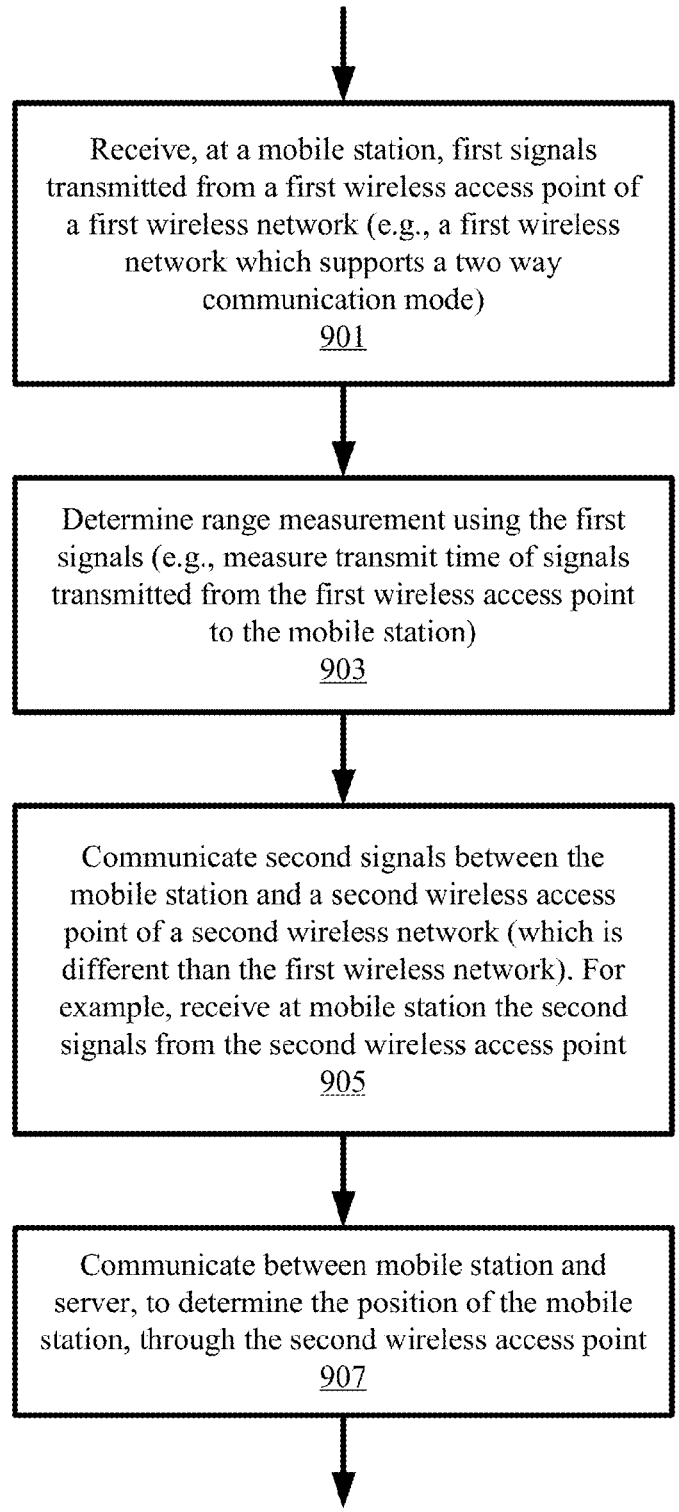
FIG. 12 shows flowchart of a hybrid positioning system according to one embodiment of the present invention.

FIG. 12 shows another exemplary method of the inventions. In this method, a mobile station receives, in operation 901, first signals transmitted from a first wireless access point of a first wireless network. The first wireless network may support two way communication between the various nodes within the first wireless network as well as nodes outside of this network. In operation 903, at least one range measurement is determined using the first signals. If additional signals from other wireless access points of the first wireless network are also available, then additional range measurements to these other wireless access points (and their identification information) are obtained. In an alternative implementation of operation 903, another measurement (e.g., a signal strength measurement of the first signals) may be taken by the mobile station without attempting to make a range measurement using the first signals. In one exemplary implementation, a time of travel of the first signals from the first wireless access point to the mobile station is measured and an identification of this first wireless access point is received from the first wireless access point. In operation 905, second signals are communicated between the mobile station and a second wireless access point of a second wireless network, which is different than the first wireless network. The mobile station may, in this operation, receive the second signals (which may include SPS assistance data, etc.) from the second wireless access point. In operation 907, the mobile station and the server communicate to determine the position of the mobile station. This communication may be through the second wireless access point. For example in operation 907, the mobile station may transmit the range measurements and identification information (from operation 903) and SPS pseudoranges (obtained by the mobile station) to the server through the second wireless access point. The identification information is used to obtain the location of the wireless access points to which range measurements (or other measurements) were obtained and the server may then determine the position of the mobile station using at least some of the available measurements (e.g., the SPS pseudoranges to SPS satellites and the range measurements or other measurements, to various terrestrial wireless access points). Alternatively, the mobile station may determine its position (rather than the server doing so) using the range measurements and SPS pseudoranges and using information provided by the server (such as the location of the identified wireless access points in one or both of the wireless networks).

The first wireless network in FIG. 12 may be a wireless local area network and, in this case, the first wireless access point may be a wireless router operating according to a Wi-Fi standard. Alternatively, the first wireless network may be a wireless cellular telephone network operated by a first service provider and the second wireless network may be another (different) wireless cellular telephone network operated by a second service provider. The mobile station, which may be a cellular telephone with an integrated GPS receiver, is authorized to operate with only the second wireless network and not the first wireless network. Various other alternatives, discussed herein, may also apply to this example of FIG. 12.

Figure 13:
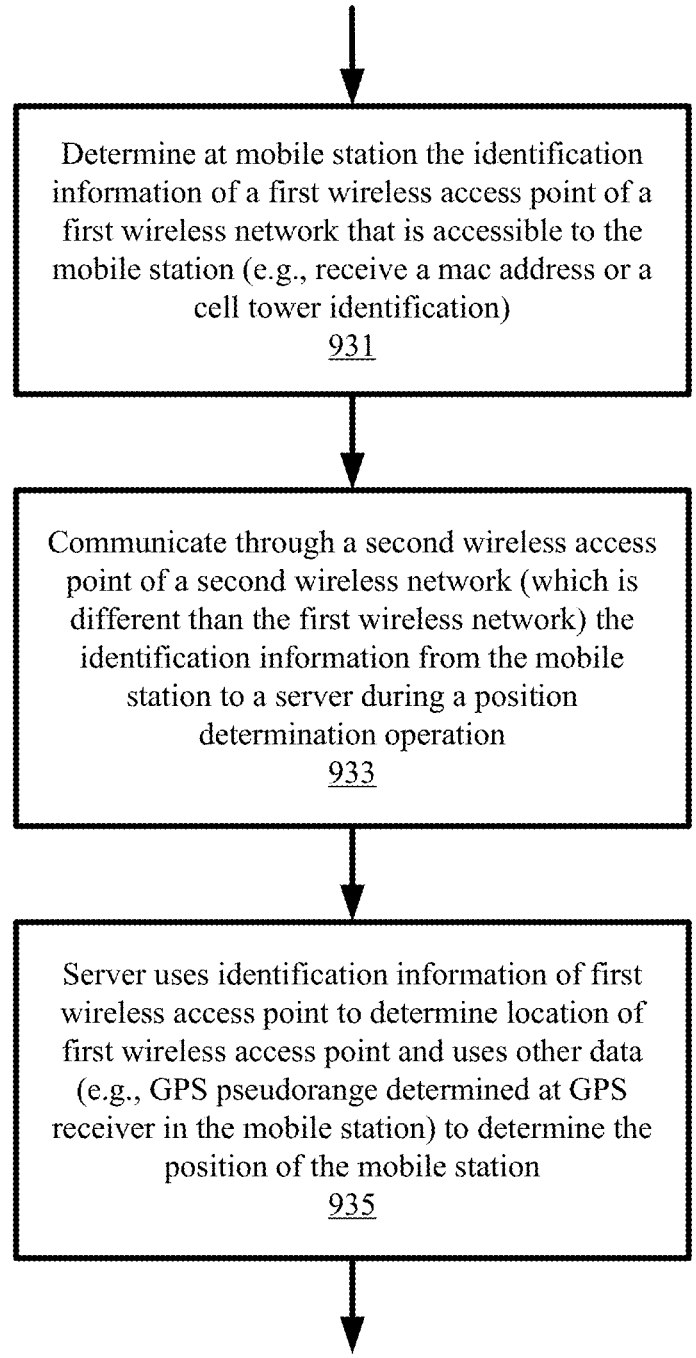
FIG. 13 shows another flowchart of a hybrid positioning system according to one embodiment of the present invention.

FIG. 13 is another example of a method of the inventions. In this example, the mobile station, in operation 931, obtains an identification information of a first wireless access point of a first wireless network that is accessible (e.g., within radio communication) to the mobile station. This identification may be a MAC address (e.g., in an Ethernet local area network) or a cellular telephone base station (e.g., "cell tower") identifier. In operation 933, the mobile station transmits, through a second wireless access point of a second wireless network, the identification information to a server (e.g., a location server) during a position determination operation. In this example, the second wireless network is different than the first wireless network (e.g., different air interfaces, different service providers, etc.). Then, in operation 935, the server uses the identification information of the first wireless access point to determine the location of the first wireless access point (which may have been harvested/collected through methods described herein, such as in FIG. 14). The server may also, in operation 935, use other data (e.g., SPS pseudoranges determined at a GPS receiver that is integrated into the mobile station and then transmitted to the server) to determine the position of the mobile station. The server may, for example, combine the SPS pseudoranges with the measurements on signals from the wireless access points to determine the position of the mobile station. Alternatively, the SPS pseudoranges may be combined with the known locations of the wireless access points (particularly in the case of wireless LANs, which have shorter signal ranges). In another alternative to operation 935, the server may provide assistance data (e.g., the location of the first wireless access point and possibly other data such as Doppler data for SPS satellites in view of the mobile station, etc.) to the mobile station but the server does not compute the position of the mobile station; rather, the mobile station performs the position solution using at least some of the available measurements (e.g., SPS pseudoranges, range measurements or other measurements relative to the wireless access points of one or all available wireless networks) and the available assistance data from the server.

Figure 14:
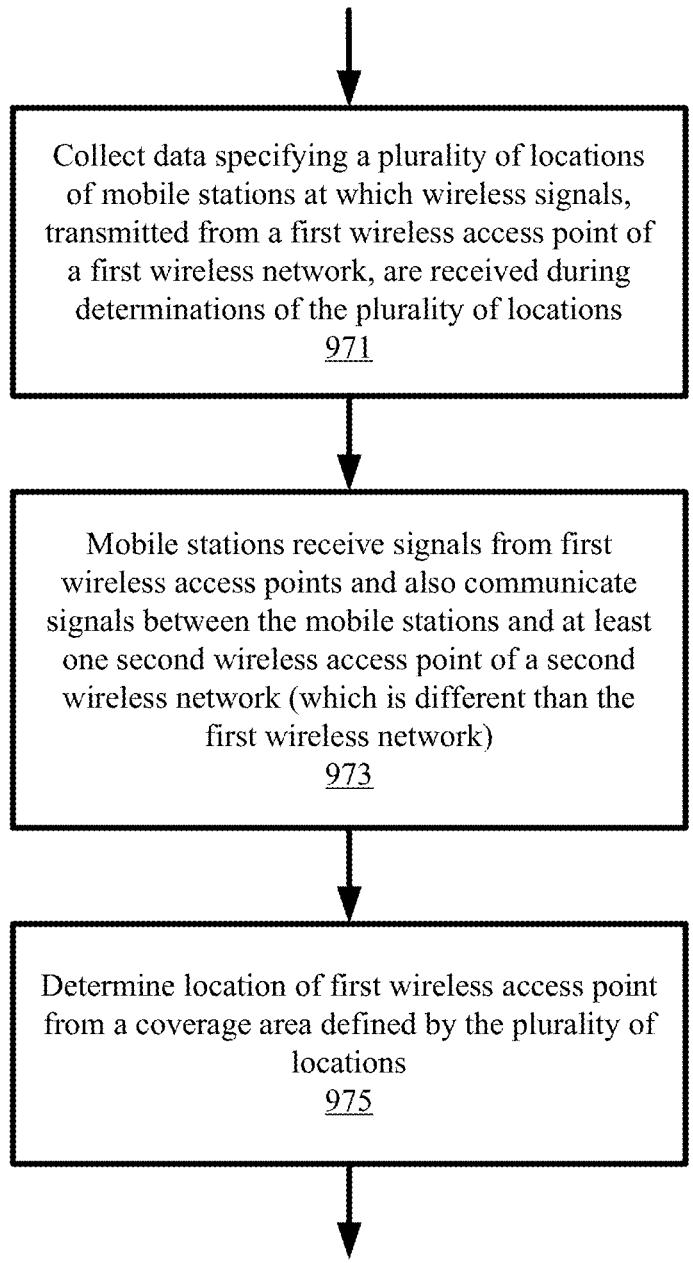
FIG. 14 shows a flowchart of a method to determine the position information of a wireless access point according to one embodiment of the present invention.

FIG. 14 shows another exemplary method of the inventions. This method ultimately determines positions of wireless access points so that future position determination operations for mobile stations can be performed using multiple wireless networks as described herein. In operation 971, data is collected. This data specifies a plurality of locations of mobile stations at which wireless signals, transmitted from at least a first wireless access point of a first wireless network, are received during determinations of the plurality of locations. The mobile stations may, in operation 973, receive signals from the first wireless access points and also communicate signals between the mobile stations and at least one second wireless access point of a second wireless network (which is different than the first wireless network). This communication with the second wireless network may be for the purpose of providing information used in collecting the data, which is used to determine the locations of wireless access points of the first wireless network. In operation 975, the location of at least the first wireless access point is determined (e.g., in the manner shown in FIG. 6) from the coverage area defined by the plurality of locations.

Although the methods and apparatus of the present invention have been described with reference to GPS satellites, it will be appreciated that the descriptions are equally applicable to positioning systems, which utilize pseudolites or a combination of satellites and pseudolites. Pseudolites are ground-based transmitters, which broadcast a PN code (similar to a GPS signal), typically modulated on an L-band carrier signal, generally synchronized with GPS time. Each transmitter may be assigned a unique PN code so as to permit identification by a remote receiver. Pseudolites are useful in situations where GPS signals from an orbiting satellite might be unavailable, such as tunnels, mines, buildings or other enclosed areas. As used herein, the term "satellite" is intended to include pseudolites or equivalents of pseudolites and the term GPS signals is intended to include GPS-like signals from pseudolites or equivalents of pseudolites.

In the preceding discussion the invention has been described with reference to application upon the United States Global Positioning Satellite (GPS) system. It should be evident, however, that these methods are equally applicable to similar satellite positioning systems, and in particular, the Russian GLONASS system and the proposed European Galileo System. The GLONASS system primarily differs from GPS system in that the emissions from different satellites are differentiated from one another by utilizing slightly different carrier frequencies, rather than utilizing different pseudorandom codes. In this situation substantially all the circuitry and algorithms described previously are applicable. The term "GPS" used herein includes such alternative satellite positioning systems, including the Russian GLONASS system and the European Galileo System.

Although the operations in the above examples are illustrated in specific sequences, from this description, it will be appreciated that various different operation sequences and variations can be used without having to be limited to the above illustrated examples.

The above examples are illustrated without presenting some of the details known in the art; as pointed out in the above discussion, these details can be found in publications, such as U.S. Pat. Nos. 5,812,087, 5,841,396, 5,874,914, 5,945,944, 5,999,124, 6,061,018, 6,208,290 and 6,215,442, all of which are hereby incorporated here by reference.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of determining a position of a mobile station, the method comprising:
 receiving with a mobile station wireless signals from a first base station in a first wireless network, wherein the first wireless network operates with a first communication protocol;
 receiving with the mobile station wireless signals from a second base station in a second wireless network, wherein the second wireless network operates with a second communication protocol that is different than the first communication protocol;
 determining a first identity of the first base station from the wireless signals from the first base station in the first wireless network;
 determining a second identity of the second base station from the wireless signals from the second base station in the second wireless network;
 determining which of the two networks through which to communicate with a location server having access to a base station almanac based upon a connection status;
 transmitting the first and second base station identities to the location server via the determined network;
 receiving, from the location server, corresponding positions of the first and second base stations; and
 determining the position of the mobile station based on the received positions.

2. The method of claim 1, the method further comprising:
 receiving, at a receiver, Satellite Positioning System (SPS) signals from SPS satellites;
 wherein the act of determining the position of the mobile station based on the received positions is further based on the SPS signals from the SPS satellites.

3. The method of claim 1, wherein the first wireless network and the second wireless network are operated by different service providers.

4. The method of claim 1, wherein the first wireless network and the second wireless network operate different communication protocols and are operated by a common service provider.

5. The method of claim 1, wherein the act of determining the position of the mobile station based on the received positions occurs at a location server.

6. The method of claim 1, wherein the mobile station is subscribed to the first wireless network, and wherein the mobile station is not subscribed to the second wireless network.

7. The method of claim 6, further comprising:
 obtaining assistance data from the first wireless network.

8. The method of claim 7, wherein the assistance data comprises Satellite Positioning System (SPS) assistance data.

9. The method of claim 7, further comprising:
 obtaining assistance data from the first wireless network; and
 transmitting pseudorange measurements to a location server.

10. The method of claim 1, wherein determining the position of the mobile station is further based on signal strengths of wireless signals received from the first base station and the second base station.

11. The method of claim 1, wherein determining which of the two networks through which to communicate with the location server comprises selecting both the first network and the second network for communicating with the location server.

12. The method of claim 1, wherein determining which of the two networks through which to communicate with the location server comprises calculating a trade-off between cost and performance of using the first network as compared to the second network for communicating with the location server.

13. An apparatus for determining a position of the mobile station, the mobile device comprising:
    means for receiving wireless signals from a first base station in a first wireless network, wherein the first wireless network operates with a first communication protocol;
    means for receiving wireless signals from a second base station in a second wireless network, wherein the second wireless network operates with a second communication protocol that is different than the first communication protocol;
    means for determining a first identity of the first base station from the wireless signals from the first base station in the first wireless network;
    means for determining a second identity of the second base station from the wireless signals from the second base station in the second wireless network;
    means for determining which of the two networks through which to communicate with a location server having access to a base station almanac based upon a connection status;
    means for transmitting the first and second base station identities to the location server via the determined network;
    means for receiving, from the location server, corresponding positions of the first and second base stations; and
    means for determining the position of the mobile station based on the received positions.

14. The apparatus of claim 13, further comprising:
    means for receiving Satellite Positioning System (SPS) signals from SPS satellites, wherein the means for determining the position of the mobile station based on the received positions uses the SPS signals from the SPS satellites.

15. The apparatus of claim 13, wherein the first wireless network and the second wireless network are operated by different service providers.

16. The apparatus of claim 13, wherein the first wireless network and the second wireless network operate different communication protocols and are operated by a common service provider.

17. The apparatus of claim 13, wherein the means for determining the position of the mobile station based on the received positions comprises a location server.

18. The apparatus of claim 13, wherein the mobile station is subscribed to the first wireless network, and wherein the mobile station is not subscribed to the second wireless network.

19. The apparatus of claim 18, further comprising:
    means for obtaining assistance data from the first wireless network.

20. The apparatus of claim 19, wherein the assistance data comprises Satellite Positioning System (SPS) assistance data.

21. The apparatus of claim 19, further comprising:
    means for obtaining assistance data from the first wireless network; and
    means for transmitting pseudorange measurements to a location server.

22. A mobile device comprising a processor and a memory wherein the memory includes software instructions configured to cause the mobile device to:
    receive wireless signals from a first base station in a first wireless network, wherein the first wireless network operates with a first communication protocol;
    receive wireless signals from a second base station in a second wireless network, wherein the second wireless network operates with a second communication protocol that is different than the first communication protocol;
    determine a first identity of the first base station from the wireless signals from the first base station in the first wireless network;
    determine a second identity of the second base station from the wireless signals from the second base station in the second wireless network;
    determine which of the two networks through which to communicate with a location server having access to a base station almanac based upon a connection status;
    transmit the first and second base station identities to the location server via the determined network;
    receive, from the location server, corresponding positions of the first and second base stations; and
    determine the position of the mobile station based the received positions.

23. The mobile device of claim 22, wherein software instructions are further configured to cause the mobile device to:
    receive Satellite Positioning System (SPS) signals from SPS satellites, wherein the act of determining the position of the mobile station based on the received positions is further based on the SPS signals from the SPS satellites.

24. The mobile device of claim 22, wherein the first wireless network and the second wireless network are operated by different service providers.

25. The mobile device of claim 22, wherein the first wireless network and the second wireless network operate different communication protocols and are operated by a common service provider.

26. The mobile device of claim 22, wherein the mobile station is subscribed to the first wireless network, and wherein the mobile station is not subscribed to the second wireless network.

27. The mobile device of claim 26, wherein software instructions are further configured to cause the mobile device to:
    obtain assistance data from the first wireless network.

28. The mobile device of claim 27, wherein the assistance data comprises Satellite Positioning System (SPS) assistance data.

29. The mobile device of claim 27, wherein software instructions are further configured to cause the mobile device to:
    obtain assistance data from the first wireless network; and
    transmit pseudorange measurements to a location server.

30. A non-transitory computer-readable medium tangibly embodying a program of machine-readable instructions executable by a digital processing apparatus to perform a method for determining a position of a mobile station having memory and a processor, said method comprising operations of:

receiving wireless signals from a first base station in a first wireless network, wherein the first wireless network operates with a first communication protocol;

receiving wireless signals from a second base station in a second wireless network, wherein the second wireless network operates with a second communication protocol that is different than the first communication protocol;

determining a first identity of the first base station from the wireless signals from the first wireless network;

determining a second identity of the second base station from the wireless signals from the second base station in the second wireless network;

determining which of the two networks through which to communicate with a location server having access to a base station almanac based upon a connection status;

transmitting the first and second base station identities to the location server via the determined network;

receiving, from the location server, corresponding positions of the first and second base stations; and determining the position of the mobile station based on the received positions.

31. The non-transitory computer-readable medium of claim 30, said method further comprising operations of:

receiving, at a receiver, Satellite Positioning System (SPS) signals from SPS satellites, wherein the act of determining the position of the mobile station based on the received positions is further based on the SPS signals from the SPS satellites.

32. The non-transitory computer-readable medium of claim 30, wherein the first wireless network and the second wireless network are operated by different service providers.

33. The non-transitory computer-readable medium of claim 30, wherein the first wireless network and the second wireless network operate different communication protocols and are operated by a common service provider.

34. The non-transitory computer-readable medium of claim 30, wherein the act of determining the position of the mobile station based on the received positions occurs at a location server.

35. The non-transitory computer-readable medium of claim 30, wherein the mobile station is subscribed to the first wireless network, and wherein the mobile station is not subscribed to the second wireless network.

36. The non-transitory computer-readable medium of claim 35, said method further comprising operation of:

obtaining assistance data from the first wireless network.

37. The non-transitory computer-readable medium of claim 36, wherein the assistance data comprises Satellite Positioning System (SPS) assistance data.

38. The non-transitory computer-readable medium of claim 36, said method further comprising operations of:

obtaining assistance data from the first wireless network; and transmitting pseudorange measurements to a location server.

* * * * *